United States Patent
Zaremski et al.

(10) Patent No.: US 10,002,307 B2
(45) Date of Patent: Jun. 19, 2018

(54) SUGGESTION GENERATION BASED ON DATA EXTRACTION

(71) Applicants: Jonathan Zaremski, San Mateo, CA (US); Michael Griffin, Redwood City, CA (US)

(72) Inventors: Jonathan Zaremski, San Mateo, CA (US); Michael Griffin, Redwood City, CA (US)

(73) Assignee: Ricoh Co., Ltd., Tokyo (JP)

(*) Notice: Subject to any disclaimer, the term of this patent is extended or adjusted under 35 U.S.C. 154(b) by 16 days.

(21) Appl. No.: 15/164,760

(22) Filed: May 25, 2016

(65) Prior Publication Data

US 2017/0177969 A1    Jun. 22, 2017

Related U.S. Application Data

(60) Provisional application No. 62/269,900, filed on Dec. 18, 2015.

(51) Int. Cl.
*G06K 9/46* (2006.01)
*G06K 9/62* (2006.01)
*G06Q 10/08* (2012.01)

(52) U.S. Cl.
CPC ......... *G06K 9/4604* (2013.01); *G06K 9/6267* (2013.01); *G06Q 10/087* (2013.01)

(58) Field of Classification Search
CPC .................. G06K 9/00; G06Q 10/087
See application file for complete search history.

(56) References Cited

U.S. PATENT DOCUMENTS

2009/0059270 A1\* 3/2009 Opalach .............. G06K 9/00 358/1.15
2013/0051611 A1\* 2/2013 Hicks ................ G06Q 10/0875 382/103

\* cited by examiner

*Primary Examiner* — Bhavesh Mehta
*Assistant Examiner* — Menatoallah Youssef
(74) *Attorney, Agent, or Firm* — Patent Law Works LLP

(57) ABSTRACT

The disclosure includes a system and method for classifying conditions of a data stream of object information. An image recognition receives an image and identifies a plurality of objects from the image. The image recognition application generates a data stream including information about the plurality of objects. The image recognition application generates a score based on the information about the plurality of products, determines a condition from the data stream based on the score, and generates a suggestion based on the condition. The image recognition application further provides the suggestion to a user.

20 Claims, 22 Drawing Sheets

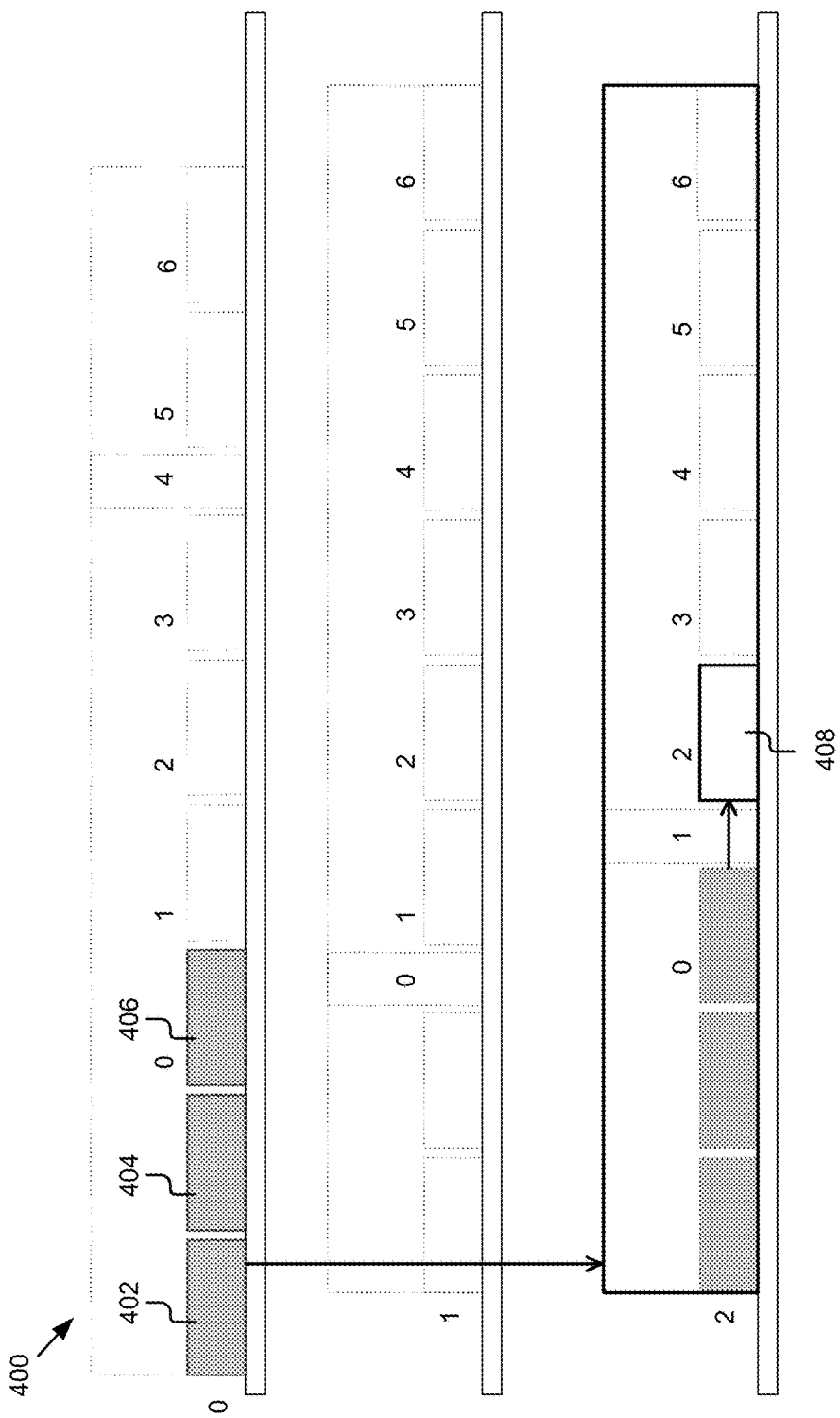

SUGGESTION GENERATION BASED ON DATA EXTRACTION

CROSS REFERENCE TO RELATED APPLICATIONS

The present application claims priority, under 35 U.S.C. § 119, of U.S. Provisional Patent Application No. 62/269,900, filed Dec. 18, 2015 and entitled "Suggestion Generation Based on Data Extraction," which is incorporated by reference in its entirety.

BACKGROUND

1. Field of the Invention

The specification generally relates to analyzing and extracting data from images including a plurality of objects. In particular, the specification relates to a system and method for classifying conditions of a data stream that represents real world objects and analyzing the conditions to provide insight into the state of the real world objects.

2. Description of the Background Art

A planogram is a visual representation of products in a retail environment. For example, a planogram may describe where in the retail environment and in what quantity products should be located. Such planograms are known to be effective tools for increasing sales, managing inventory and otherwise ensuring that the desired quantity of objects are placed to optimize profits or other parameters. However, presentation and maintenance of adequate levels of stock on shelves, racks and displays stands is a labor-intensive effort, thereby making enforcement of planograms difficult. In addition, the planograms and the actual retail environment change over time, which cause the maintenance more difficult. An approach that can capture overall data including time-changing information and provide real-time feedback is desired.

SUMMARY

The techniques introduced herein overcome the deficiencies and limitations of the prior art, at least in part, with a system and method for classifying conditions of a data stream that represents real world objects and analyzing the conditions to provide insight into the state of the real world objects. In one embodiment, the system includes an image recognition application. The image recognition application is configured to receive one or more images and identify a plurality of objects from the one or more images. The image recognition application is further configured to generate a data stream including information about the plurality of objects. The image recognition application is further configured to generate a score based on the information about the plurality of products, determine a condition from the data stream based on the score, and generate a suggestion based on the condition. The image recognition application is further configured to provide the suggestion to a user.

Other aspects include corresponding methods, systems, apparatuses, and computer program products for these and other innovative aspects.

The features and advantages described herein are not all-inclusive and many additional features and advantages will be apparent to one of ordinary skill in the art in view of the figures and description. Moreover, it should be noted that the language used in the specification has been principally selected for readability and instructional purposes and not to limit the scope of the techniques described.

BRIEF DESCRIPTION OF THE DRAWINGS

The techniques introduced herein are illustrated by way of example, and not by way of limitation in the figures of the accompanying drawings in which like reference numerals are used to refer to similar elements.

FIG. 4 depicts a graphical representation of example illustrating the calculation of distances from a sweet spot according to an embodiment.

DETAILED DESCRIPTION

Figure 1:
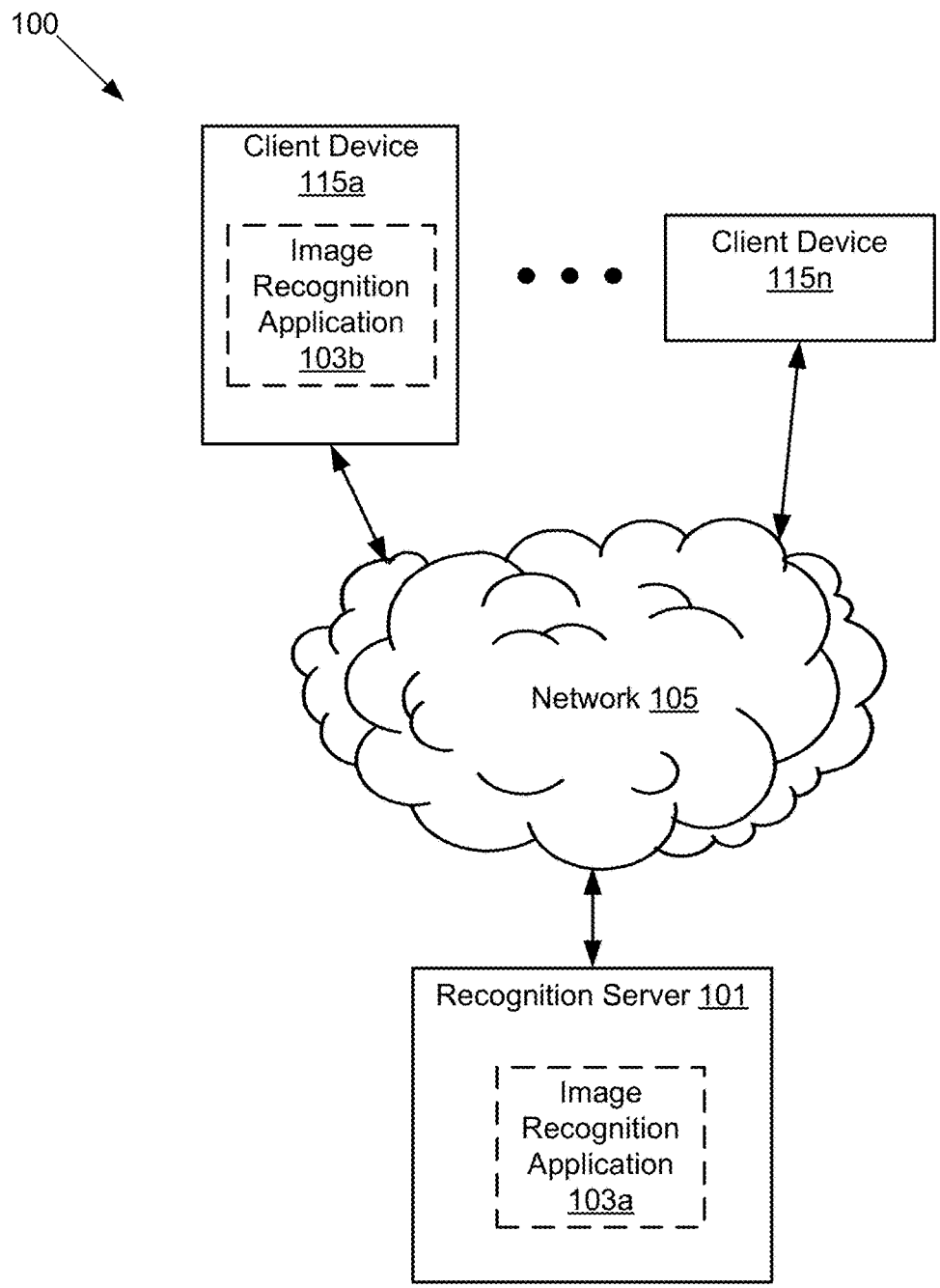
FIG. 1 is a high-level block diagram illustrating one embodiment of a system for classifying conditions of a data stream of object information.

FIG. 1 is a high-level block diagram illustrating one embodiment of a system 100 for classifying conditions of a data stream of object information. The illustrated system 100 may have client devices 115a ... 115n that can be accessed by users and a recognition server 101. In FIG. 1 and the remaining figures, a letter after a reference number, e.g., "115a," represents a reference to the element having that particular reference number. A reference number in the text without a following letter, e.g., "115," represents a general reference to instances of the element bearing that reference number. In the illustrated embodiment, these entities of the system 100 are communicatively coupled via a network 105.

The network 105 can be a conventional type, wired or wireless, and may have numerous different configurations including a star configuration, token ring configuration, or other configurations. Furthermore, the network 105 may include a local area network (LAN), a wide area network (WAN) (e.g., the Internet), and/or other interconnected data paths across which multiple devices may communicate. In some embodiments, the network 105 may be a peer-to-peer network. The network 105 may also be coupled to or include portions of a telecommunications network for sending data in a variety of different communication protocols. In some embodiments, the network 105 may include Bluetooth communication networks or a cellular communications network for sending and receiving data including via short messaging service (SMS), multimedia messaging service (MMS), hypertext transfer protocol (HTTP), direct data connection, WAP, email, etc. Although FIG. 1 illustrates one network 105 coupled to the client devices 115 and the recognition server 101, in practice one or more networks 105 can be connected to these entities.

In one embodiment, the system 100 includes a recognition server 101 coupled to the network 105. In some embodiments, the recognition server 101 may be either a hardware server, a software server, or a combination of software and hardware. The recognition server 101 may be, or may be implemented by, a computing device including a processor, a memory, applications, a database, and network communication capabilities. In the example of FIG. 1, the components of the recognition server 101 are configured to implement an image recognition application 103a described in more detail below. In one embodiment, the recognition server 101 provides services to a consumer packaged goods firm for identifying products on shelves, racks, or displays. While the examples herein describe recognition of products in an image of shelves, such as a retail display, it should be understood that the image may include any arrangement of organized objects. For example, the image may be of a warehouse, stockroom, store room, cabinet, etc. Similarly, the objects, in addition to retail products, may be tools, parts used in manufacturing, construction or maintenance, medicines, first aid supplies, emergency or safety equipment, etc.

In some embodiments, the recognition server 101 sends and receives data to and from other entities of the system 100 via the network 105. For example, the recognition server 101 sends and receives data including images of objects to and from the client device 115. The images of objects received by the recognition server 101 can include an image captured by the client device 115, an image copied from a website or an email, or an image from any other source. Although only a single recognition server 101 is shown in FIG. 1, it should be understood that there may be any number of recognition servers 101 or a server cluster.

The client device 115 may be a computing device that includes a memory, a processor and a camera, for example a laptop computer, a desktop computer, a tablet computer, a mobile telephone, a smartphone, a personal digital assistant (PDA), a mobile email device, a webcam, a user wearable computing device or any other electronic device capable of accessing a network 105. The client device 115 provides general graphics and multimedia processing for any type of application. The client device 115 includes a display for viewing information provided by the recognition server 101. While FIG. 1 illustrates two client devices 115a and 115n, the disclosure applies to a system architecture having one or more client devices 115.

The client device 115 is adapted to send and receive data to and from the recognition server 101. For example, the client device 115 sends a query image to the recognition server 101 and the recognition server 101 provides data in JSON (JavaScript Object Notation) format about one or more objects recognized in the query image to the client device 115.

The image recognition application 103 may include software and/or logic to provide the functionality for generating a data stream including information of a plurality of objects based on processing one or more images with the objects, classifying conditions of the data stream, and generating a suggestion based on a condition, among other things. In some embodiments, the image recognition application 103 can be implemented using programmable or specialized hardware. In some embodiments, the image recognition application 103 can be implemented using a combination of hardware and software. In other embodiments, the image recognition application 103 may be stored and executed on a combination of the client devices 115 and the recognition server 101, or by any one of the client devices 115 or recognition server 101.

In some embodiments, the image recognition application 103b acts as a thin-client application with some functionality executed on the client device 115 and additional functionality executed on the recognition server 101 by image recognition application 103a. For example, the image recognition application 103b on the client device 115 could include software and/or logic for capturing the image, transmitting the image to the recognition server 101, and displaying image recognition results. A thin-client application 103b may include further functionality described herein with reference to image recognition application 103, such as processing the image and performing feature identification.

In some embodiments, the image recognition application 103 receives an image. For example, the image may be of a shelf displaying breakfast cereal boxes in a retail supermarket. The image recognition application 103 determines a plurality of objects from the image. In some embodiments, the image recognition application 103 may identify an object (e.g., a breakfast cereal box) from the image. In other embodiments, the image recognition application 103 may determine an unindexed object (e.g., a red box with a flower on it) from the image without discovering a matching object in a database. The image recognition application 103 generates a data stream including information of the plurality of objects collected at one time or multiple times over time. For example, the data stream may include prices of a product collected once a week, every week.

The image recognition application 103 determines various conditions such as out of stock condition, product recall condition, etc., from the data stream. In some embodiments, the image recognition application 103 generates a score and determines a condition based on the score. For example, the image recognition application 103 generates a planogram adherence score to measure the difference between a planogram and a realogram, and determines a planogram adherence condition based on the planogram adherence score. In some cases, the image recognition application 103 also generates multiple scores and determines a condition based on at least one of the multiple scores. For example, the image recognition application 103 generates an influence score, a corrective actions score, and other scores to measure various aspects of retail execution and to provide the measurement of representative performance. The image recognition application 103 determines a representative performance condition based on one or more of the influence score, a corrective actions score, and other scores.

Once the condition is determined, the image recognition application 103 automatically generates a suggestion based on the condition or provides the condition to a user. The suggestion can be advice for performing an action. For example, for a new product condition where an unindexed product is not yet identified, the image recognition application 103 generates advice for capturing additional information of the unindexed product, updating the data stream with the additional information, and adding the additional information to the database for indexing the product. The suggestion can also be a notification. Continuing with the above example, the image recognition module 103 may generate a notification notifying the presence of the new product for purpose of competitive awareness and tracking, or notifying that the portion of data may be used in making a business plan. In another example, a notification is an alert generated when a planogram adherence score satisfies a threshold (e.g., below a threshold score), or when the planogram adherence score is on a consistent downturn (e.g., over a threshold time period). The operation of the image recognition application 103 and the functions listed above are described below in more detail with reference to FIGS. 3-18.

The approach described herein is advantageous in many ways. The image recognition application 103 collects data in a greater frequency than that of human surveys, field work, etc., and generates a data stream including up-to-date data. The image recognition application 103 can then generate real-time feedback based on the up-to-date data. For example, the image recognition application 103 can instruct a representative to get stock of a product at the same day the product stockout occurs. Because of the up-to-date data and real-time feedback, the image recognition application 103 increases timeliness and provides unbiased data, which in turn benefits the cost reduction of collecting the data. As a result, the image recognition application 103 is able to collect a larger amount of data as compared to other applications. Also the image recognition application 103 generates practical feedback or suggestion for a user to perform an action. For example, the image recognition application 103 tells a user at which location a product is misplaced, which product should be placed at that location, and to which location the misplaced product should be moved. The image recognition application 103 further quantifies various aspects of retail execution and provides clear instructions or solutions to a problem. For example, the image recognition application 103 computes a corrective actions score to measure how well corrective actions are performed. From this score, the image recognition application 103 identifies a number of corrective actions that have yet not been performed and instructs store management to address issues that should have been solved by the corrective actions. The image recognition application 103 automatically generates suggestions that provide explicit instructions or solutions to address difficult problems for a human. For example, for the situation such as a "hidden out of stock" in a store where a missing product has been covered up with a different product in the same space, a store representative may not realize there is a problem, much less solving the problem. However, the image recognition application 103 can automatically discover such problem and provide clear solution. In addition, the image recognition application 103 presents graphical data to a user to vividly and intuitively understand a problem.

Figure 2:
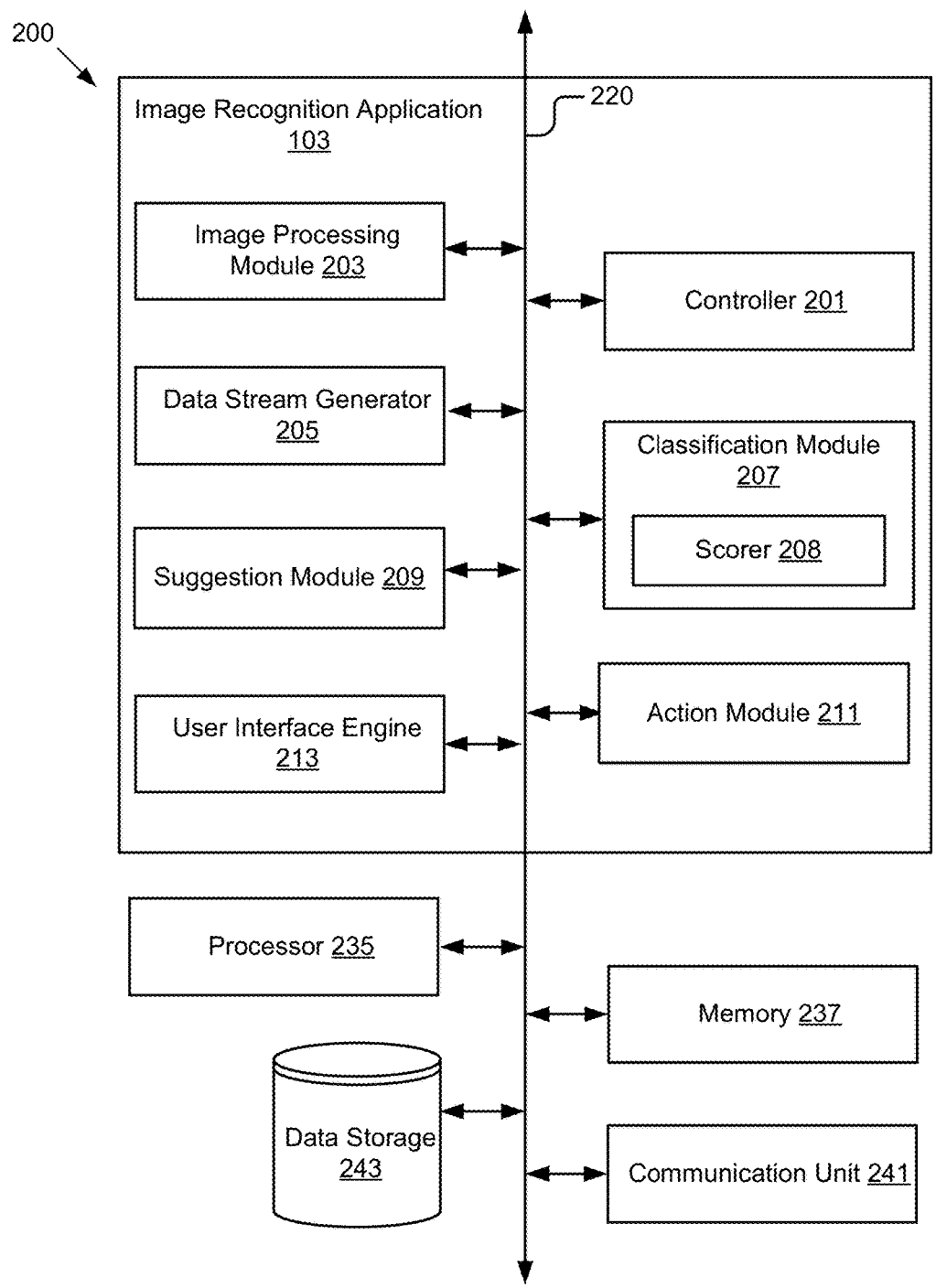
FIG. 2 is a block diagram illustrating one embodiment of a computing device including an image recognition application.

FIG. 2 is a block diagram illustrating one embodiment of a computing device 200 including an image recognition application 103. The computing device 200 may also include a processor 235, a memory 237, a communication unit 241, and data storage 243 according to some examples. The components of the system 200 are communicatively coupled to a bus or software communication mechanism 220 for communication with each other. In some embodiments, the computing device 200 may be a client device 115, a recognition server 101, or a combination of a client device 115 and a recognition server 101.

The processor 235 may execute software instructions by performing various input/output, logical, and/or mathematical operations. The processor 235 may have various computing architectures to process data signals including, for example, complex instruction set computer (CISC) architecture, a reduced instruction set computer (RISC) architecture, and/or an architecture implementing a combination of instruction sets. The processor 235 may be physical and/or virtual, and may include a single processing unit or a plurality of processing units and/or cores. In some implementations, the processor 235 may be capable of generating and providing electronic display signals to a display device, supporting the display of images, capturing and transmitting images, performing complex tasks including various types of feature extraction and sampling, etc. In some implementations, the processor 235 may be coupled to the memory 237 via the bus 220 to access data and instructions therefrom and store data therein. The bus 220 may couple the processor 235 to the other components of the computing device 200 including, for example, the memory 237, the communication unit 241, the image recognition application 103, and the data storage 243. It will be apparent to one skilled in the art that other processors, operating systems, sensors, displays, and physical configurations are possible.

The memory 237 may store and provide access to data for the other components of the computing device 200. The memory 237 may be included in a single computing device or distributed among a plurality of computing devices as discussed elsewhere herein. In some implementations, the memory 237 may store instructions and/or data that may be executed by the processor 235. The instructions and/or data may include code for performing the techniques described herein. For example, in one embodiment, the memory 237 may store the image recognition application 103. The memory 237 is also capable of storing other instructions and data, including, for example, an operating system, hardware drivers, other software applications, databases, etc. The memory 237 may be coupled to the bus 220 for communication with the processor 235 and the other components of the computing device 200.

The memory 237 may include one or more non-transitory computer-usable (e.g., readable, writeable) device, a static random access memory (SRAM) device, an embedded memory device, a discrete memory device (e.g., a PROM, FPROM, ROM), a hard disk drive, an optical disk drive (CD, DVD, Blu-Ray™, etc.) mediums, which can be any tangible apparatus or device that can contain, store, communicate, or transport instructions, data, computer programs, software, code, routines, etc., for processing by or in connection with the processor 235. In some implementations, the memory 237 may include one or more of volatile memory and non-volatile memory. For example, the memory 237 may include, but is not limited to, one or more of a dynamic random access memory (DRAM) device, a static random access memory (SRAM) device, an embedded memory device, a discrete memory device (e.g., a PROM, FPROM, ROM), a hard disk drive, an optical disk drive (CD, DVD, Blu-Ray™, etc.). It should be understood that the memory 237 may be a single device or may include multiple types of devices and configurations.

The communication unit 241 is hardware for receiving and transmitting data by linking the processor 235 to the network 105 and other processing systems. The communication unit 241 receives data such as requests from the client device 115 and transmits the requests to the controller 201, for example a request to process an image including a plurality of objects to generate a data stream. The communication unit 241 also transmits information including advice for performing an action to the client device 115 for display, for example, in response to a condition classified from the data stream. The communication unit 241 is coupled to the bus 220. In one embodiment, the communication unit 241 may include a port for direct physical connection to the client device 115 or to another communication channel. For example, the communication unit 241 may include an RJ45 port or similar port for wired communication with the client device 115. In another embodiment, the communication unit 241 may include a wireless transceiver (not shown) for exchanging data with the client device 115 or any other communication channel using one or more wireless communication methods, such as IEEE 802.11, IEEE 802.16, Bluetooth® or another suitable wireless communication method.

In yet another embodiment, the communication unit 241 may include a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. In still another embodiment, the communication unit 241 may include a wired port and a wireless transceiver. The communication unit 241 also provides other conventional connections to the network 105 for distribution of files and/or media objects using standard network protocols such as TCP/IP, HTTP, HTTPS, and SMTP as will be understood to those skilled in the art.

The data storage 243 is a non-transitory memory that stores data for providing the functionality described herein. The data storage 243 may be a dynamic random access memory (DRAM) device, a static random access memory (SRAM) device, flash memory, or some other memory devices. In some embodiments, the data storage 243 also may include a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In the illustrated embodiment, the data storage 243 is communicatively coupled to the bus 220. The data storage 243 stores data for analyzing a received image and results of the analysis and other functionality as described herein. For example, the data storage 243 may store images of a plurality of objects received from the client device 115, a data stream including object information of the plurality of objects, conditions classified from the data stream, scores associated with conditions, and advice and notification generated based on one or more conditions. The data stored in the data storage 243 is described below in more detail.

In some embodiments, the image recognition application 103 may include a controller 201, an image processing module 203, a data stream generator 205, a classification module 207, a suggestion module 209, an action module 211, and a user interface engine 213. The components of the image recognition application 103 are communicatively coupled via the bus 220. The components of the image recognition application 103 may include software and/or logic to provide the functionality they perform. In some embodiments, the components can be implemented using programmable or specialized hardware including a field-programmable gate array (FPGA) or an application-specific integrated circuit (ASIC). In some embodiments, the components can be implemented using a combination of hardware and software executable by processor 235. In some embodiments, the components are instructions executable by the processor 235. In some implementations, the components are stored in the memory 237 and are accessible and executable by the processor 235.

The controller 201 may include software and/or logic to control the operation of the other components of the image recognition application 103. The controller 201 controls the other components of the image recognition application 103 to perform the methods described below with reference to FIGS. 3 and 4. In some implementations, the processor 235, the memory 237, and other components of the image recognition application 103 can cooperate and communicate without the controller 201.

In some embodiments, the controller 201 sends and receives data, via the communication unit 241, to and from one or more of a client device 115 and a recognition server 101. For example, the controller 201 receives, via the communication unit 241, an image from a client device 115 operated by a user and sends the image to the image processing module 203. In another example, the controller 201 receives data for providing a graphical user interface to a user from the user interface engine 213 and sends the data to a client device 115, causing the client device 115 to present the user interface to the user.

In some embodiments, the controller 201 receives data from other components of the image recognition application 103 and stores the data in the data storage 243. For example, the controller 201 may receive information of a plurality of objects from the image processing module 203 and stores the data in the data storage 243. In other embodiments, the controller 201 retrieves data from the data storage 243 and sends the data to other components of the image recognition application 103. For example, the controller 201 may receive a data stream including information of a plurality of objects from the data storage 243, and transmit the data to the image classification module 207.

The image processing module 203 may include software and/or logic to provide the functionality for receiving and processing one or more images and outputting information associated with a plurality of objects determined from the one or more images.

In some embodiments, the image processing module 203 receives one or more images for recognition from a user. For example, an image may include multiple products on a shelf in a retail store. The image can be an image of packaged products such as, rectangular breakfast cereal boxes, circular soda bottles, etc. captured by the client device 115 at a distance from the shelving unit. The packaged product may include textual and pictorial information printed on its surface that distinguishes it from other items on the shelf. The packaged product may also sit in an arbitrary orientation on the shelf at any given time.

The image processing module 203 extracts features from the one or more received images and matches the extracted features to those features stored in the data storage 243 for recognition. The image processing module 203 identifies a plurality of objects in the one or more received images matching the stored features. The image processing module 203 returns each identified object along with object information such as an object identifier, one or more images associated with an object, a location of an object, metadata related to an object, etc.

In some embodiments, the image processing module 203 determines a unique identifier for an object identified from the one or more received images. For example, the identifier may be a universal product code (UPC) of a breakfast box or an international standard book number (ISBN) of a book. The image processing module 203 may also generate an identifier to uniquely identify an object, for example, a new product.

In some embodiments, the image processing module 203 determines one or more images associated with an identified object. The one or more images can be an object image, an indexed image in a database, or an image of a plurality of objects. For example, the image processing module 203 retrieves an indexed image of an object from a database stored on the data storage 243 and associates the indexed image with the object. In another example, when the object is a product identified from the one or more images depicting products in a retail environment, the image processing module 203 may also retrieve an image of the planogram that describes where in the retail environment and in what quantity products should be located and associate the planogram with the product.

In some embodiments, the image processing module 203 determines a location of an identified object. For example, the image processing module 203 may identify an absolute position of an object in a received image with x-y coordinates of the object. The location can also be a relative location. For example, the image processing module 203 may determine the location of product A relative to product B, or the location of product A relative to a shelf, or the location of product A relative to other points of reference (e.g., a light source, a sign).

In some embodiments, the image processing module 203 also determines metadata related to an identified object. For example, for a product sitting on a shelf of a retailer store, the image processing module 203 may determine metadata of a product including packaging dimension, packaging identifier, price of the product as sold in the retailer store, the number of product facing (e.g., one facing for one box of a brand, two facings for two boxes of the same brand sitting side by side), shelf identifier, width, height, depth, area, diagonal length, color, product attributes such as product name, product weight, product volume, product description, product size, ingredients, nutritional information, manufacturer brand, model number, material, or the like. In some embodiments, the image processing module 203 retrieves the metadata corresponding to the identified object from the data storage 243. It will be apparent to one skilled in the art that other metadata of an identified object might be determined.

In other embodiments, the image processing module 203 may determine from the one or more received images information about an object such as an image of the object, a location of the object, metadata related to the object (e.g., color, size, etc.). The image processing module 203 may not match the object information to information stored in a database. As a result, the image processing module 203 labels this object as an unindexed object.

In some embodiments, the image processing module 203 transmits the received images, identified objects, unindexed objects, and object information to the data stream generator 205. In other embodiments, the image processing module 203 also stores the received images, identified objects, unindexed objects, and object information on the data storage 243. In some embodiments, the image processing module 203 receives images captured at different time and provides time series data of objects to the data stream generator 205. The image processing module 203 may store the images captured over multiple time periods, and provide the image data to the data generator 205 responsive to receiving a signal from the classification module 207. For example, the image processing module 203 receives images that is related to a store, a shelf, a universal product code, etc. and was captured over multiple time periods, and stores the images in the data storage 243. When the classification module 207 signals the image processing module 203 that images of a shelf at multiple time periods are needed, for example, for checking the repetition of stockouts of the shelf, the image processing module 203 retrieves the images of the shelf from the data storage 243 and transmits the images to the data stream generator 205 for further analysis.

The data stream generator 205 may include software and/or logic to provide the functionality for generating a data stream to include object information determined by the image processing module 203.

The data stream generator 205 receives information of an object identified from one or more received images. The data stream generator 205 may also receive information of an unindexed object determined from the one or more received images. The object information associated with an object may include an object identifier, one or more associated images, a location of the object, metadata related to the object, etc. The data stream generator 205 generates a data stream including information of a plurality of objects. The data stream includes observations of objects in real world and ideal data of the objects, which provides useful information for improvement in practice.

In some embodiments, the data stream generator 205 generates a data stream based on object information collected at one time. For example, the image processing module 203 processes the images taken at a single visit to a single store to identify objects and determine object information. The data stream generator 205 generates a single event oriented data stream based on the object information determined by the image processing module 203. In other embodiments, the data stream generator 205 generates a time series based data stream of object information, for example, from images taken during multiple visits to a store. In some embodiments, the data stream generator 205 generates a time series based data stream based on a signal from the classification module 207. For example, the classification module 207 sends a signal to the image processing module 203 to retrieve images of a store captured over multiple time periods. The data stream generator 205 generates a time series based data stream based on the retrieved images. In some other embodiments, the data stream generator 205 aggregates and summarizes object information received from the image processing module 203 to generate a data stream. For example, the data stream generator 205 generates a data stream by aggregating the object information determined from images of multiple stores of the same or different type, or by aggregating the object information determined from images of multiple stores with the same or different local demographics, or by aggregating the object information collected over time. In some embodiments, the data stream generator 205 transmits the data stream to the classification module 207. In other embodiments, the data stream generator 205 stores the data stream on the data storage 243.

The classification module 207 may include software and/or logic to provide the functionality for classifying conditions of a data stream. In some embodiments, the classification module 207 includes a scorer 208. The scorer 208 calculates at least one score that is used to identify a condition.

The classification module 207 receives a data stream of a plurality of objects and classifies conditions of the data stream. In some embodiments, the classification module 207 determines a condition from the data stream and extracts a portion of data from the data stream based on the condition. For example, the classification module 207 determines a condition based on identifying that a product sitting at a location of a shelf is on a recall list, and outputs information including the location of the product for further processing. In some embodiments, the scorer 208 calculates a score using data received from the data stream, and the classification module 207 uses the score to identify a specific condition, e.g., by determining whether the score satisfies a predetermined threshold. For example, the scorer 208 computes a planogram adherence score, a profit potential score, a relative stock keeping unit (SKU) price adherence score, etc. using different types of data from the data stream, and the classification module 207 uses each of these score to determine a corresponding condition. In some embodiments, the scorer 208 normalizes the score to a certain range, for example, 1 to 100. The higher score, the better, from a business perspective, the measured condition.

In some embodiments, the classification module 207 communicates with the suggestion module 209, the action module 211, and the user interface engine 213 to present a merchandising representative and/or other staff with a graphical guide (e.g., overlays on real store images) to assist the representative in quickly identifying the condition and in quickly resolving a problem that is reflected by the condition. In some embodiments, the classification module 207 also communicates with modules/engines 209-213 to provide a near augmented reality tool to assist representatives in quickly identifying the location of an issue on a shelf as well as offering intuitive and clear instructions to the representatives about how to quickly resolve the issue.

For simplicity of description, the classification module 207 will be described below based on a data stream that includes product information of a retail environment. The data stream generator 205 generates the data stream based on images taken from a single visit to a single store, multiple visits to a single store, multiple visits to multiple stores. It should be understood that the classification module 207 can function similarly in other environment such as warehouse, stockroom, store room, cabinet, etc. It should also be understood that the classification module 207 may determine more conditions and extract more data from the data stream than example conditions and example extracted data described below.

In some embodiments, the classification module 207 determines an out of stock or stockout condition from the data stream and extracts a portion of data from the data stream based on the stockout condition. In some embodiments, the classification module 207 identifies missing products on a shelf (e.g., based on the voids of the shelf) of an image taken from a single visit to a store and determines a regular stockout condition. The classification module 207 extracts location data of the missing products (e.g., x-y coordinates of the missing products in the image) from the data stream, and associates the extracted data to the regular stockout condition. In other embodiments, the classification module 207 compares the image taken from a retailer store with an image of the planogram that describes where in the retailer store and in what quantity products should be located, and determines a hidden out of stock condition by identifying products other than a particular product appearing at the positions where the particular product is expected be located. By this way, the classification module 207 automatically detects a hidden out of stock condition, which is hard to be manually discovered in practice. In some embodiments, the classification module 207 also identifies the unexpected products sitting at the locations of the particular product is expected to be. For example, the classification module 207 determines that a second product and a third product show in the locations of a first product. The classification module 207 extracts a portion of data including the received image, the planogram image, information of the particular product (i.e., the missing product), information of the unexpected products, the current locations of the unexpected products, the expected locations of the unexpected products, etc., and associates the extracted data to the hidden out of stock condition.

When the classification module 207 receives the time series based data stream including product information collected over time, the classification module 207 can track and store repetition of stockouts. In some embodiments, the classification module 207 signals the image processing module 203 to cooperate with the data stream generator 205 to generate a time series based data stream based on images of a store captured at different time, and tracks and records stockouts of a particular product in the store based on the data stream that is generated from multiple visits to the store at different time. In other embodiments, the classification module 207 tracks and records frequency of stockouts across multiple stores over a time period based on the data stream that is generated from multiple visits to multiple stores. It is advantageous that the classification module 207 can automatically detect recurring stockouts because it is difficult for a person to do so based on his or her memory.

In some embodiments, the classification module 207 determines a product recall condition from the data stream and extracts a portion of data from the data stream based on the product recall condition. The classification module 207 matches product information in the data stream to a list of recall products in a database. For example, the classification module 207 determines whether a received image of the data stream includes the recall products. The classification module 207 identifies a product recall condition responsive to a match (e.g., determining that the received image includes the recall products). In some embodiments, the classification module 207 flags each recall product on the received image. The classification module 207 extracts, from the data stream, a portion of data including the received image, locations of the recall products (e.g., flagged products) in the received image, the list of recall products, etc., and associates the extracted data with the product recall condition.

In some embodiments, the classification module 207 determines a position map condition from the data stream and extracts a portion of data from the data stream based on the position map condition. The classification module 207 receives a product location indicating an actual position of the product shown in a received image. The product location may indicate an absolute position or a relative position of the product. The classification module 207 compares the actual position of the product to the expected position of the product shown in an image of the planogram (i.e., the image showing ideal/expected product positions) and determines a position map condition based on the comparison. In some embodiments, the classification module 207 overlays the position information onto the image of the planogram to determine a position map condition.

The position map condition indicates whether a product is located at the right place. The position map condition also indicates a frequency of a product sitting in wrong locations over time. For example, the classification module 207 determines that a product is actually positioned at places A1, A2, and B1 in three weeks based on three weekly-taken images of a retailer store. The classification module 207 overlays the actual positions A1, A2, and B1 on images of the planogram that show the expected positions A1, B1, and B2. From the overlaps and non-overlap on the images, the classification module 207 determines the position map condition. The classification module 207 determines the position map condition at a single point in time, for example, the condition indicates that the product is at the right place in the first week. The classification module 207 determines the position map condition at multiple points in time, which may provide evidence of a recurring problem reflected by position changes over time. For example, the condition at multiple points of time shows that the product is misplaced twice in the three-week window, which may suggest continuing poor performance of a representative, recurring stockout of some other products, etc. By tracking product positions with the position map condition, the classification module 207 clearly identifies and visually presents where the wrong location is and where the correct location should be. The current approaches may notify a user a universal product code in a wrong position; however, it has limited use in a store where a large amount of products sit on shelves.

In some embodiments, the classification module 207 determines a position map condition based on product locations in a single store. In other embodiment, the classification module 207 determines a position map condition based on product locations in two or more stores by aggregating location information of the two or more stores. The classification module 207 extracts, from the data stream, a portion of data including the received image, the planogram image, actual locations of a product in the received image, expected locations of the product in the planogram image, etc., and associates the extracted data and the overlays with the position map condition. In some embodiments, the classification module 207 may also compare the portion of data against sales data, and factor into next season planning, profit expectations, sales expectations, etc. The classification module 207 may update the portion of data with the comparison results.

In some embodiments, the classification module 207 determines a new product condition from the data stream and extracts a portion of data from the data stream based on the new product condition. In some embodiments, the classification module 207 identifies an unindexed product from the data stream and determines a new product condition. The information of an unindexed product is absent in a database, i.e., the features of unindexed product (e.g., luminance, color, package dimension) do not match the features stored in the database. The classification module 207 extracts a portion of data including an image of the unindexed image, a location of the unindexed product and features of the unindexed product from the data stream. The extracted data can be used to instruct a person to capture more data. For example, the location of the unindexed product can be used by a field representative to capture pictures of all sides of the package of the unindexed product and obtain metadata such as fluid ounces, nutrition information, etc. The extracted data will then be used to combine with the newly captured data and additional information (e.g., obtained from other resources) to identify the product and index the product in the database. In other embodiments, the classification module 207 determines a new product condition based on identifying a new product from competitors' product information in the data stream. For example, the data stream includes competitors' on-shelf inventory that was collected during one or more visits to the competitors' store. The classification module 207 extracts the competitor's product information from the data stream and associates the extracted data with the new product condition. In some embodiments, the classification module 207 may also combine the extracted data with other data to change business plans, for example, based on what competitors are doing with the new product.

In some embodiments, the classification module 207 determines a planogram adherence condition from the data stream and extracts a portion of data from the data stream based on the planogram adherence condition. The classification module 207 determines a planogram adherence condition based on a planogram adherence score. The planogram adherence score (PAS) measures the difference between a planogram and a realogram. In the retail environment, the planogram describes where and in what number of facings products should be located, and the realogram (e.g., an image received from a store) describes where and in what quantity products are actually located. The planogram adherence score is used by representatives and representative managers to assess store and retail execution performance. The planogram adherence score is also used by category managers and trade promotions managers to evaluate SKU and category level performance, or by representatives to rework on assortments.

The scorer 208 computes a planogram adherence score as the weighted score sum in Equation 1 below. A planogram adherence score measures the difference between an intended layout of products on a shelf from a planogram and the actual layout of products on a shelf based on a realogram. Usually a single planogram or a single realogram describe part (e.g., sections, categories or brands of products) of a store. For example, a first planogram and a second planogram respectively describe the layout of ice creams and toothpastes on a shelf in the store, while a first realogram and a second realogram (e.g., based on a first image and a second image captured from different sections of the store) describe the actual layout of the ice creams and toothpastes on a shelf in the store. Since a store may have multiple planograms and corresponding realograms, in some embodiments, the scorer 208 calculates multiples planogram adherence scores.

In some embodiments, the scorer 208 calculates the planogram adherence score. The planogram adherence score may range from 1 to 100, where 100 indicates the best case scenario (i.e., where every product that is identified from the received images is in its correct location as described by the planogram). Correspondingly, a planogram adherence score of 1 indicates very poor compliance between the realogram and the planogram.

In some embodiments, the scorer 208 calculates the planogram adherence score as follows:

PAS=(w1×Shelf Score+w2×Shelf Variance Score+ w3×Distance Score+(1−w1−w2−w3) ×Distance Variance Score) (1a)

where w1, w2, w3, and (1−w1−w2−w3) (hereafter referred as "w4") indicate weights that can be specified by a user to provide relative importance of a Shelf Score, a Shelf Variance Score, a Distance Score, and a Distance Variance Score. To calculate the Shelf Score, the scorer 208 determines a shelf score for each SKU in the received image (as described in more detail below with reference to FIG. 3E) and combines the shelf scores for all SKUs found in the received image to generate the Shelf Score for the realogram.

The weights w1, w2, w3, and w4 are normalized to a range 0 to 1 and sum to 1. In some embodiments, the weights w1, w2, w3, and w4 are user determined. An organizer of a planogram may want to arrange the sections of a cereal aisle by cereal types (e.g., healthy cereals, regular cereals, and sugar cereals each have a section). The organizer does not distinguish the shelves where each type of cereals are placed (e.g., whether a cereal box is placed on the top shelf or on the bottom shelf makes no difference). As a result, the organizer may assign a low weight w1 to the Shelf Score so that the Shelf Score is a relatively minor factor in calculating the planogram adherence score using Equation 1a. On the other hand, if the organizer thinks that a high-demand product has to be placed on the eye-level shelf such that consumers can get it at the first glance (e.g., the shelf on which a product is placed plays an important role) the organizer may assign a high weight w1 to the Shelf Score to reflect the importance of the Shelf Score in calculating the planogram adherence score. In other embodiments, the weights w1, w2, w3, and w4 are determined using a machine learning algorithm. The scorer 208 takes the user-determined weights as the initial weights of the machine learning process and calculates the improved weights w1, w2, w3, and w4 based on feedback obtained from the machine learning process. Continuing with the above example, the scorer 208 may increase w1 to increase the Shelf Score importance in calculating the planogram adherence score when the machine learning process establishes a strong relation between cereal sales and shelf position.

To calculate the Distance Score, the scorer 208 determines a distance score for each SKU in the received image, to indicate how far each product is from an expected position within a shelf) as described in more detail below with reference to FIG. 3D. In some embodiments, the scorer combines the distance scores for all SKUs found in the received image to generate the Distance Score for the realogram.

The scorer 208 also computes the Shelf Variance Score and the Distance Variance Score to quantify the amount of variation or dispersion when calculating the Shelf Score and the Distance Score for all SKUs in the realogram. In some embodiments, the Shelf Score and Distance Score are combined to an Item Score (discussed below with reference to FIG. 3F), which along with the variance score is used to calculate the planogram adherence score using the following PAS=(w1×Item Score+w2×Shelf Variance Score+w3× Distance Variance Score) (1b)

where w1, w2, and w3 are between 0 and 1 and sum to 1.

Figure 3A:
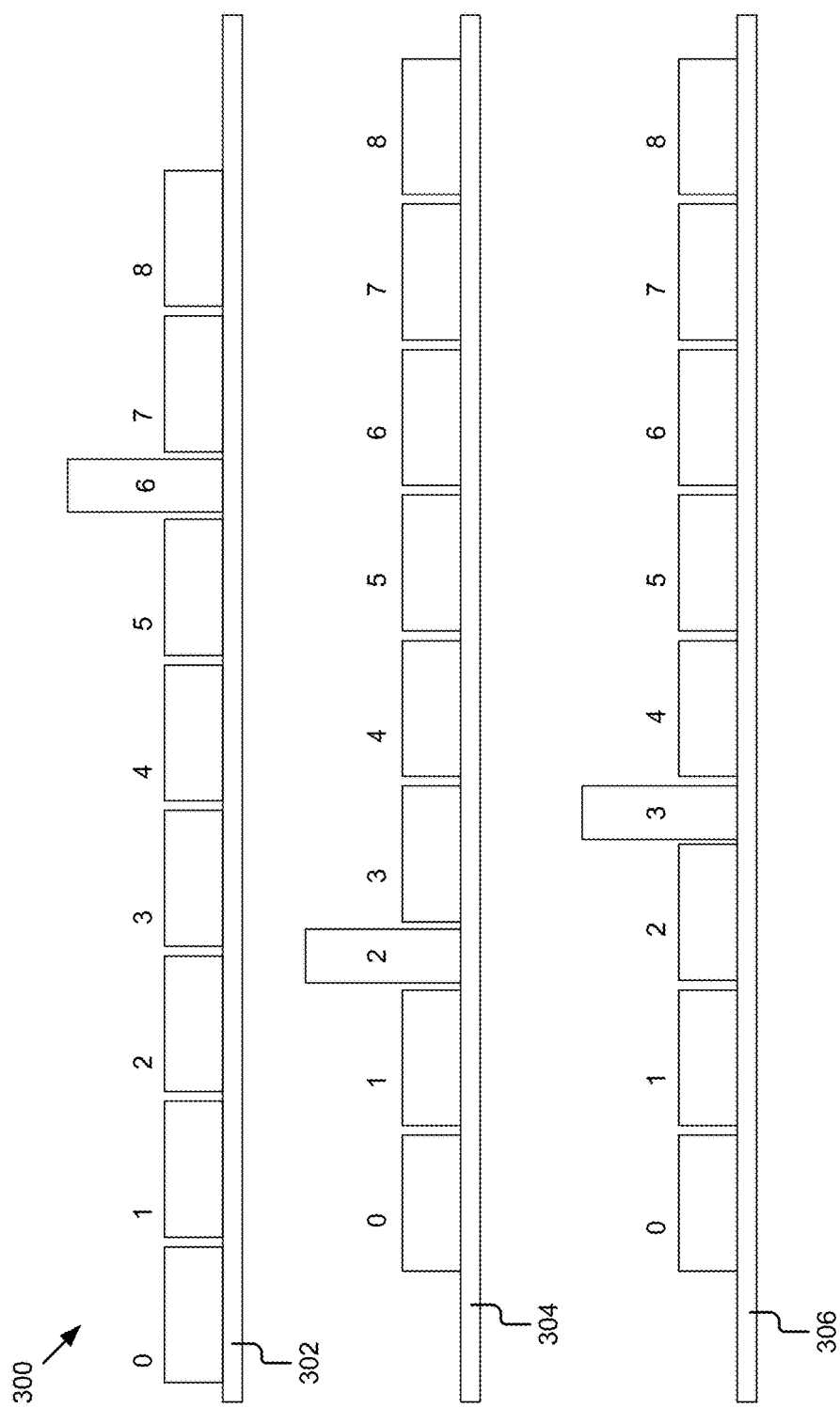
FIG. 3A depicts a graphical representation of an example recognition result of a received image of a store according to an embodiment.

FIG. 3A depicts a graphical representation 300 of an example recognition result of a received image of a store. In the illustrated example of FIG. 3A, there are three shelves 302, 304, and 306. A number associated with each shelf indicates a slot at which a product is located. For example, slot 0 to slot 8 associated with shelf 302 correspond to nine positions where nine products sit on shelf 302.

Figure 3B:
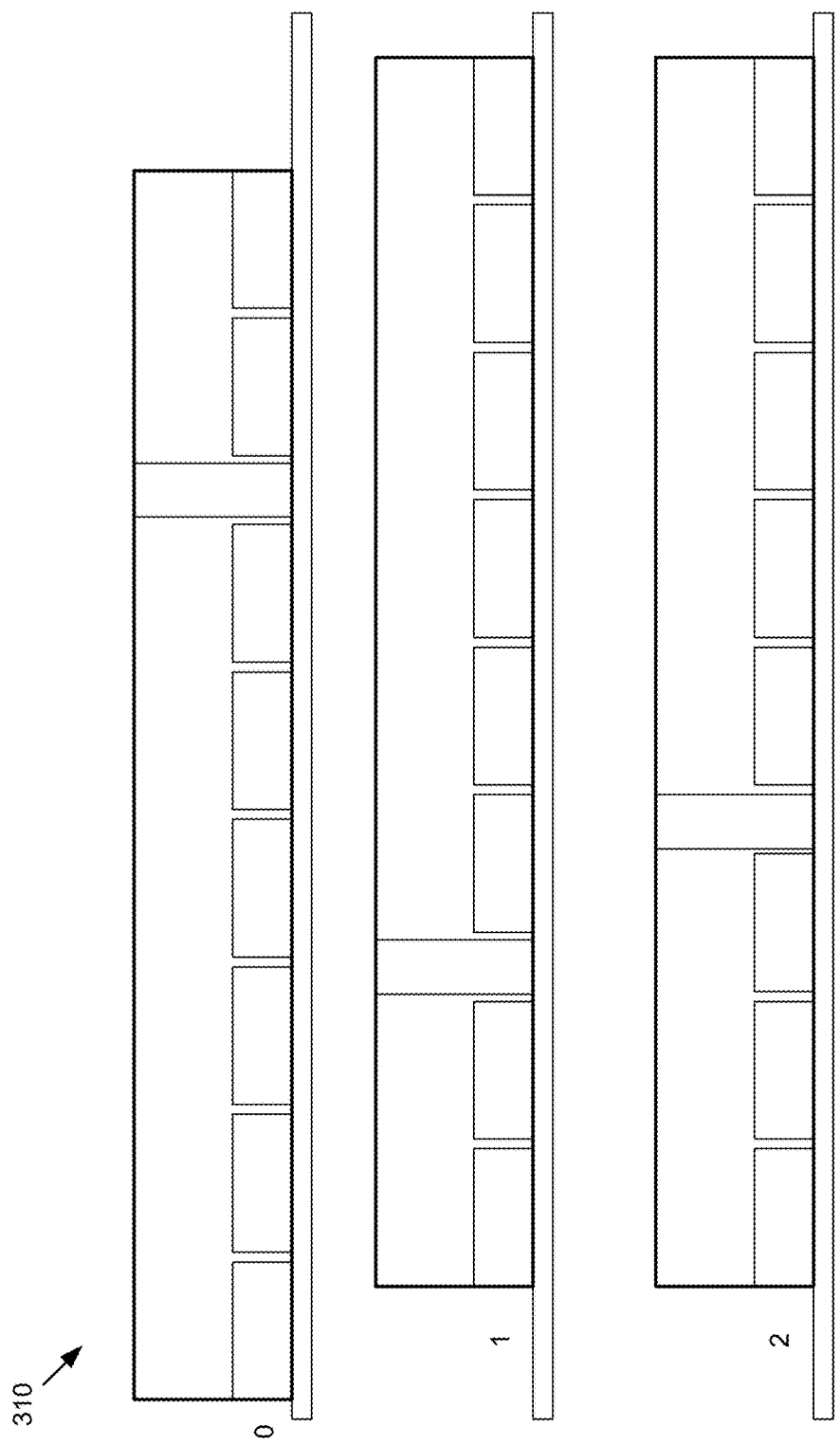
FIG. 3B depicts a graphical representation of example linear groups in the recognition result shown in FIG. 3A according to an embodiment.

FIG. 3B depicts a graphical representation 310 of example linear groups (i.e., a group of recognition results on a shelf) of the recognition result shown in FIG. 3A. In the example of FIG. 3B, three linear groups 0, 1, and 2 are illustrated using bold rectangular boxes. The linear groups are used to count the displacement in the shelves. For example, linear group 0 is one shelf away from linear group 1.

Figure 3C:
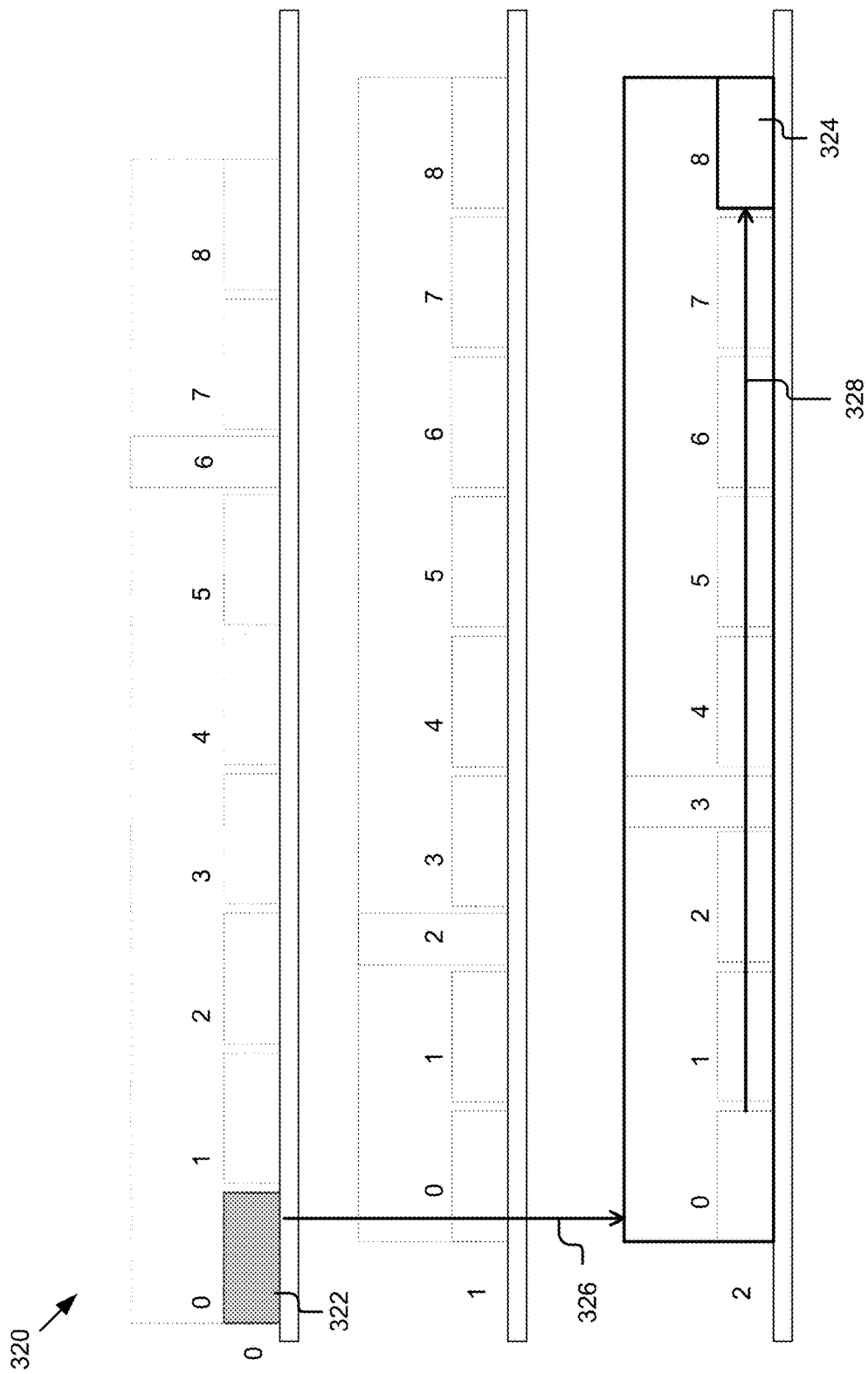
FIG. 3C depicts a graphical representation of an example illustrating worst case scores according to an embodiment.
Figure 3D:
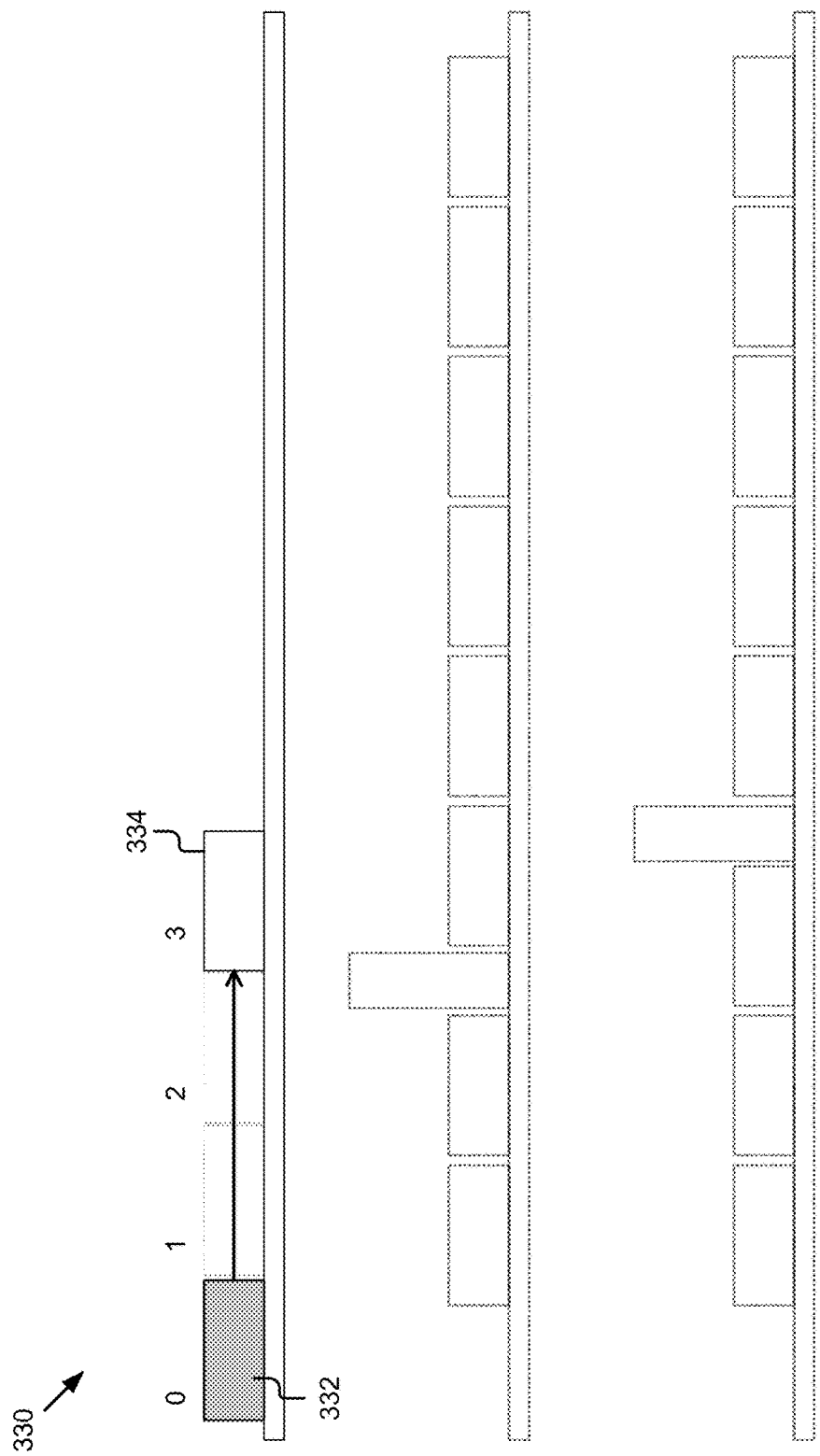
FIG. 3D depicts a graphical representation of an example illustrating the calculation of a distance score for a product according to an embodiment.

FIG. 3C depicts a graphical representation 320 of an example illustrating a worst case score for a product. A slot 322 in grey color on the top left of FIG. 3C indicates an expected position of a SKU based on a planogram. A slot 324 on the bottom right of FIG. 3C indicates the farthest position that the product can be from the expected position in terms of shelves and in terms of slots. In the example of FIG. 3C, the slot 322 is two shelves away from slot 324 as indicated by arrow 326 and eight positions away as indicated by arrow 328.

In some embodiments, the scorer 208 calculates a distance score for each product (Distance Score$_{SKU}$) as a measurement of how far a SKU is from the expected position within a shelf (i.e., the horizontal distance). In some embodiments, the scorer 208 calculates the Distance Score$_{SKU}$ as follows:

$$\text{Distance Score}_{SKU} = \frac{\text{maximal distance} - \text{actual distance}}{\text{maximal distance}} \times 100 \quad (2)$$

For each SKU on a shelf, for which the expected position is known from the planogram, the scorer 208 uses Equation 2 to calculate the Distance Score$_{SKU}$. In various embodiments, the distance between products, used in calculating the Distance Score$_{SKU}$, can be measured in product slots, inches, or other units. FIG. 3D depicts a graphical representation 330 of an example illustrating the calculation of a Distance Score$_{SKU}$. As described above, slot 332 is the expected position of a product and slot 334 is the actual position of the product. As shown in the example of FIG. 3D, the distance between slots 332 and 334 (i.e., the "actual distance" in Equation 2) is three slots. The "maximal distance" in Equation 2 is the longest possible distance within a shelf between any two product slots. In the example of FIG. 3D, the maximal distance is eight slots. Therefore, for the product found in slot 334 (where the expected location is in slot 332), the Distance Score$_{SKU}$ is $$\text{Distance Score}_{SKU} = \frac{8-3}{8} \times 100 = 62.5$$

With the normalizing factor 100 in Equation 2, the Distance Score$_{SKU}$ in Equation 2 is normalized between zero and 100. For a given SKU or product, the scorer 208 determines a score of 100 when the SKU is found at the expected location and determines a score of zero if the SKU is found at the maximal lateral distance from the expected location.

In some embodiments, the scorer 208 calculates the Distance Score in Equation 1a by averaging the Distance Score$_{SKU}$ obtained in Equation 2 for all SKUs found in the received image. In some embodiments, the scorer 208 calculates the Distance Variance Score in Equation 1a as the standard deviation of the Distance Score$_{SKU}$ for all SKUs found in the received image. The Distance Variance Score measures the variability of individual SKU distance scores.

Compared to the Distance Score$_{SKU}$ in Equation 2, which measures the horizontal distance between the actual position of a product and the expected position of the product on a shelf, the Shelf Score$_{SKU}$ measures the vertical distance between the product and the expected shelf based on the location of the product in a planogram. In some embodiments, the scorer 208 calculates the Shelf Score$_{SKU}$ as follows:

$$\text{Shelf Score}_{SKU} = \frac{\text{maximal shelf distance} - \text{actual shelf distance}}{\text{maximal shelf distance}} \times 100 \qquad (3a)$$

Figure 3E:
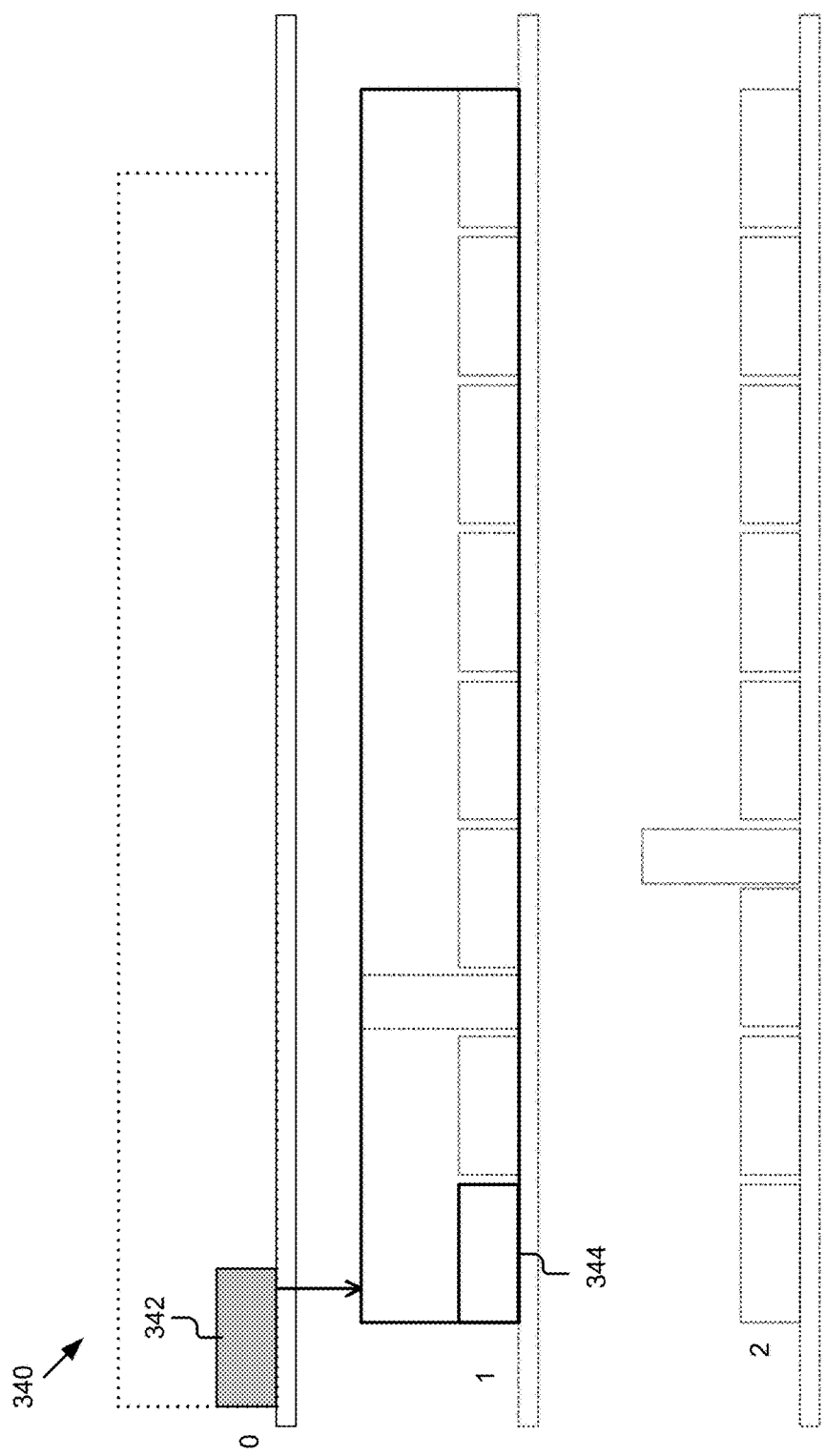
FIG. 3E depicts a graphical representation of an example illustrating the calculation of a shelf score for a product according to an embodiment.

The scorer 208 generates a Shelf Score$_{SKU}$ of 100 if the SKU is on the expected shelf. The scorer 208 generates a Shelf Score$_{SKU}$ of zero if the SKU is on the shelf at the maximum shelf distance from the expected shelf (e.g., the product is found on the top shelf while the bottom shelf is where the product is expected to be). FIG. 3E depicts a graphical representation 340 of an example illustrating the calculation of a Shelf Score$_{SKU}$ for a product. Slot 342 is located on the top shelf in the linear group 0, which is the expected shelf for the product (e.g., as indicated by the grey box). Slot 344 is the location where the product is actually found (e.g., based on the realogram image), one shelf off from the intended shelf. Therefore, the "actual shelf distance" in Equation 3a is 1. The "maximal shelf distance" in Equation 3a is the distance between the farthest shelves per the planogram. In the example of FIG. 3E, the maximal shelf distance is two between the linear group 0 and the linear group 2. Using Equation 3a, the Shelf Score$_{SKU}$ for the product found in slot 344 is $$\text{Shelf Score}_{SKU} = \frac{2-1}{2} \times 100 = 50$$

In some embodiments, the scorer 208 calculates the Shelf Score in Equation 1 by averaging the Shelf Score$_{SKU}$ obtained in Equation 3a for all SKUs found in the received image. In some embodiments, the scorer 208 calculates the Shelf Variance Score in Equation 1 by determining the percentage of SKUs that are not found on their intended shelves and normalizing the percentage to the range between zero and 100. Similar to the Distance Variance Score, the Shelf Variance Score is also a measurement of all SKUs instead of a single SKU.

In some embodiments, the scorer 208 calculates the Shelf Score$_{SKU}$ as an economic driven function rather than an ordinal distance driven function. For example, each shelf may be given a value by the user based on the fact that products placed in a particular shelf are expected to sell better based purely on location. Therefore, in some embodiments, the scorer 208 calculates the Shelf Score$_{SKU}$ for a product as follows:

$$\text{Shelf Score}_{SKU} = \frac{\text{sum of shelf values} - \text{shelf value difference}}{\text{sum of shelf values}} \times 100 \qquad (3b)$$

Different shelves may be given different values based on profitability, sales volume, and other market values. For example, in a planogram, product A that is expected to be more profitable than product B is placed on the top shelf because this shelf is more valuable than the bottom shelf where product B is located. For example, the top shelf may have a shelf value of six and the bottom shelf may have a shelf value of two. In some embodiments, the eye-level shelf is given the highest shelf value, the shelf above the eye-level shelf is given the second highest shelf value, the shelf below the eye-level shelf is given the third highest shelf value, and so on. Although the shelves above and below the eye-level shelf are both one shelf away from the eye-level shelf, a product expected to be on the eye-level shelf but found on one of these two shelves would have different shelf value differences because the shelves have different economic values. In some embodiments, the scorer 208 receives the shelf value associated with each shelf in a planogram from the planogram information included in the data stream. Using Equation 3b, the scorer 208 calculates the Shelf Score$_{SKU}$ based on the number of shelves intended on the planogram and economics driven values assigned to each shelf. For example, in FIG. 3E, the Shelf Score$_{SKU}$ was calculated to be 50 was a single shelf away in a short stack of three shelves. However, when the scorer 208 takes into account the shelf values, the shelf score may vary widely from 50.

Using Equation 3b, where three shelves on the planogram have shelf values of 2, 7, and 4 from top to bottom and a product expected to be on the middle shelf is on the bottom shelf, the scorer 208 calculates the Shelf Score$_{SKU}$ for the product to be $$\text{Shelf Score}_{SKU} = \frac{13-3}{13} \times 100 \approx 77$$

Based on Equation 3b, if a product is on the intended shelf, the Shelf Score$_{SKU}$ will be 100. If the product is on the most "opposite" shelf (e.g., when a top profit shelf is intended and the product is found on the least profitable shelf), the Shelf Score$_{SKU}$ will be zero. Using the Shelf Score$_{SKU}$ determined with Equation 3b for all products in the received image, the scorer 208 calculates the Shelf Score and the Shelf Variance Score in Equation 1 as described above.

In some embodiments, the classification module 207 receives the planogram adherence score determines a planogram adherence condition based on the planogram adherence score. The classification module 207 extracts, from the data stream, a portion of data including a received image, an image of the planogram, the actual locations of products, the expected locations of the products, etc., and associates the extracted data and the planogram adherence score with the planogram adherence condition.

Figure 3F:
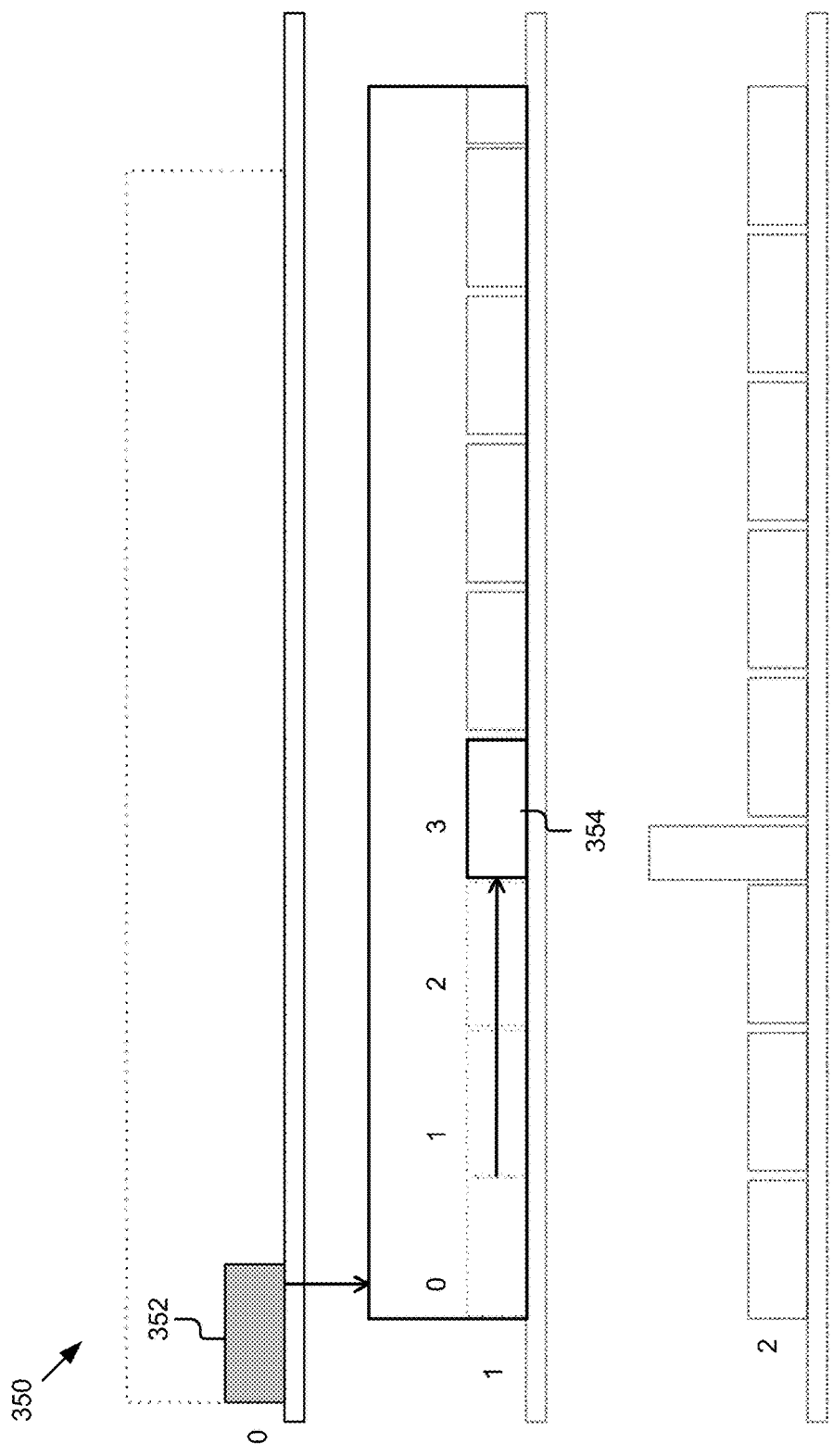
FIG. 3F depicts a graphical representation of an example illustrating the calculation of an item score for a product based on the distance score and the shelf score of the product according to an embodiment.

FIG. 3F depicts a graphical representation 350 of an example illustrating the calculation of an Item Score$_{SKU}$ for a product based on the Distance Score$_{SKU}$ and the Shelf Score$_{SKU}$ of the product. In some embodiments, the Item Score$_{SKU}$ is a weighted average of the Distance Score$_{SKU}$ and the Shelf Score$_{SKU}$ of a product as follows:

$$\text{Item Score}_{SKU} = \frac{w1 \times \text{Shelf Score}_{SKU} + w2 \times \text{Distance Score}_{SKU}}{2}$$

where w1 and w2 are user determined weights based on relative importance of the Distance Score$_{SKU}$ and the Shelf Score$_{SKU}$. The Item Score$_{SKU}$ indicates the misplacement degree of an individual product. In the illustrated example of FIG. 3F, slot 352 is the expected location of the product determined from the planogram, and slot 354 is the actual location of the product in the realogram. Using Equation 2, the Distance Score$_{SKU}$ for the product is 62.5 (as calculated in the example of FIG. 3D). Using Equation 3a, the Shelf Score$_{SKU}$ for the product is 50 (as calculated in the example of FIG. 3E). Assuming both w1 and w2 to be 1, the scorer 208 calculates the Item Score$_{SKU}$ for the product found in slot 554 to be $$\text{Item Score}_{SKU} = \frac{1 \times 50 + 1 \times 62.5}{2} = 81.25$$

which indicates that the product is not at the intended location but not far away from the intended location. The scorer 208 calculates the item scores for all SKUs per realogram along with the shelf and distance variance scores for all SKUs to determine the planogram adherence score using Equation 1b.

In some embodiments, the classification module 207 determines a profit potential condition from the data stream and extracts a portion of data from the data stream based on the profit potential condition. The classification module 207 determines a profit potential condition based on a profit potential score. The profit potential score (PPS) measures shelf placement relative to the most profitable location on a shelf. The profit potential score can be used by representatives and category managers when assessing performance of the category and SKU level performance for other decisions.

A profit potential score measures the distance of an actual location of an item or a product on a shelf from the most profitable location of the item or product on the shelf, i.e., a sweet spot. Unlike a single position that is ideal for an item provided in a planogram, the sweet spot is manually defined, for example, by users such as customers. A sweet spot may be defined based on a set of variables such as cost, revenue, profit, volume, etc. The sweet spot and the profit potential score determined based on the sweet spot provide guidance on how a product is aligned relative to where it can make the most profit. In a simple planogram, a single sweet spot may be defined. However, in a complex planogram, multiple sweet spots may exist. In some embodiments, sweet spots are defined based on product groups. A large number of products on a shelf may be divided into a small number of groups and associated with a small number of sweet spots. In some embodiments, products are grouped by brand and the sweet spots are brand dependent. For example, there may be three sweet spots in the toothpaste section of a store. The first sweet spot is for a first brand. The second sweet spot is for a second brand. The third sweet spot is for other brands. When calculating the profit potential score, the location of a toothpaste of the first brand is measured against the first sweet spot, the location of a toothpaste of the second brand is measured against the second sweet spot, and location of the toothpaste of all other brands is measured against the third sweet spot. In other embodiments, products are grouped by type and the sweet spots have an association to the SKUs of that type (e.g., a sub category). For example, each type of cereals such as regular cereal, sugar-free cereal, etc., has a sweet spot. In the case where the SKUs are associated to sweet spots, calculating the profit potential score will measure against the set of SKUs associated with a given sweet spot. In some embodiments, based on varying performance of brands or SKUs on each location of a shelf, the sweet spot is adjusted to reflect the highest profit location.

A sweet spot is not always associated with a planogram. When a planogram does not exist, sweet spots can still be defined or assigned (e.g., the center location of the eye-level shelf), and used to get meaningful information including a profit potential score. Compared to the planogram adherence score that is measured based on a planogram, the profit potential score provides even greater value when a planogram does not exist. For example, the profit potential score can be useful for helping a representative understand something is out of place from a general guidelines perspective when no planogram exists, and for generating advice for a representative to perform a corrective action.

Responsive to identifying a position of a product in a received image, the scorer 208 computes a profit potential score for a product based on the position of the product relative to a sweet spot. The profit potential score is generated for individual SKUs and is different from the planogram adherence score which is generated for the entire planogram. In some embodiments, the profit potential score ranges from 1 to 100. A profit potential score of 100 for a product indicates that the product is located at the highest profit potential position on a shelf.

In one embodiment, the scorer 208 calculates the profit potential score using Equation 4a:

PPS=Shelf Score$_{SKU}$-(Shelf Score$_{SKU}$×Sweet Spot Distance) (4a)

In another embodiment, the scorer 208 calculates the profit potential score using Equation 4b:

PPS=w1×Shelf Score$_{SKU}$+(1-w1)×Absolute Sweet Spot Distance (4b)

Depending on how a store is operated, the scorer 208 uses either Equation 4a or 4b to calculate a profit potential score. In Equation 4a, the shelf score associated with the shelf plays an important role in calculating the profit potential score. For example, using Equation 4a, if a product is actually located on the shelf where the sweet spot is, the product may get a profit potential score close to 100. If the product is not located on the shelf where the sweet spot is, the product may get a profit potential score of 50. If the product is on the shelf farthest from the sweet spot, the product may get a profit potential score of 1. In Equation 4b, the distance score measuring the absolute distance from the sweet spot play important roles in calculating the profit potential score. Equation 4b allows a user to define how important the shelf is versus how important a horizontal distance is by adjusting the weights of the shelf score and the distance score.

The Shelf Score$_{SKU}$ in Equation 4a and Equation 4b can be calculated using Equation 3b. This shelf score is based on the value of the shelf, and therefore measures the economic distance as opposed to the ordinal distance. As described above, a shelf value can be determined by user per planogram when a planogram exists. When no planogram exists, the shelf value can be determined based on the number of shelves, the height of shelves, etc. For example, a top shelf of five shelves may have a shelf value of 20 while a top shelf of eight shelves may have a shelf value of 5 because the top shelf of five shelves is at eye-level. In some embodiments, shelf values are retrieved from a table that includes shelf values determined based on the number of shelves, the height of shelves, etc.

The Sweet Spot Distance in Equation 4a indicates the distance from a sweet spot on a given shelf. For example, if a product is placed at the corresponding sweet spot, the Sweet Spot Distance is zero. If the product is placed at the farthest position from the sweet spot, the Sweet Spot Distance is 0.5. The Absolute Sweet Spot Distance in Equation 4b also indicates the distance from a sweet spot. For example, the Absolute Sweet Spot Distance is 100 when a product is placed at the corresponding sweet spot, while the Absolute Sweet Spot Distance is 1 when the maximal distance between the product and the sweet spot appears. As defined, Sweet Spot Distance and Absolute Sweet Spot Distance ensure that the profit potential score computed using either Equation 4a or Equation 4b is normalized to the range 0-100. In some embodiments, the profit potential score is not normalized.

FIG. 4 depicts a graphical representation 400 of an example illustrating the calculation of distances from a sweet spot. Slots 402, 404, and 406 in grey are sweet spots for three types of products. The sweet spots are located at different positions of the shelves, which can be close to each other as shown in this example, or be distant from each other. Based on the type of the product in slot 408, the corresponding sweet spot is slot 404. In the example of FIG. 4, the product in slot 408 is two shelves and two positions away from the sweet spot (which corresponds to a maximal Sweet Spot Distance of 0.5).

The profit potential score calculated using Equation 4a or 4b may be referred to as an actual profit potential score to be distinguished from a target profit potential score. The actual profit potential score indicates the profit potential of the product where it is found on the shelf. The target profit potential score indicates the profit potential for the product where it is expected to be placed on the shelf In some embodiments, the most profitable product has a target profit potential score of 100, the lowest profit product has a target profit potential score of 1, and every other product falls between 1 and 100. For example, a high profit product may be given a target profit potential score of 80 but have an actual profit potential score of 50 because it is one shelf away from the sweet spot. The profit potential scores can be used to provide guidance to merchandising staff on repositioning products and can be used by other staff when making product assortment decisions. For example, a high profit product with a target profit potential score within the range of 80 to 100 is supposed to be placed at the sweet spot. However, if an image received from a store shows that a high volume, low profit, low price product with a target profit potential score in the range of 1 to 20 is actually in the sweet spot, a determination that products are out of place can be made without a planogram. In addition, such information might also explain the unexpected performance of the products that are placed in unusual positions.

In some embodiments, the scorer 208 also computes a profit potential comparison score (PPCS) for an entire shelf. The scorer 208 compares the difference between an actual profit potential score of a SKU and a target profit potential score of the SKU for every SKU found on a shelf, and computes an average of the profit potential score differences as the profit potential comparison score. In some embodiments, the scorer 208 computes an arithmetic mean and a standard deviation based on the profit potential score differences for the entire shelf of the SKUs. In other embodiments, the scorer 208 computes a weighted average and a weighted deviation based on the profit potential score differences for the entire shelf of the SKUs. The weights for the weighted average and weighted deviation may be determined by users based on economic values (e.g., expected SKU profit). For example, a store manager does not care much about whether low profit products are misplaced on the entire shelf but takes it seriously if many high profit products are misplaced on the shelf. As a result, the high profit products are given higher weights than the low profit products. The profit potential score differences of the high profit products therefore contribute more to the calculation of the profit potential comparison score and cause the profit potential comparison score to easily capture the misplacement of the high profit products on the shelf. The profit potential comparison score can be used by store managers, merchandising staff, etc. to determine when it is necessary to rework an entire shelf are due to too many products being placed in suboptimal positions.

At the SKU level, if a given SKU is well out of its position, the scorer 208 will obtain a profit potential score difference that is significant from the intended score (e.g., zero). In such case, the scorer 208 flags the SKU and transmits the SKU information to the suggestion module 209 to notify a user to fix the problem. At the shelf level, the scorer 208 computes all the profit potential score differences for SKUs on the shelf and aggregates the differences to a single measure to get a sense of the degree that shelf in the store is aligned to expectations. The profit potential comparison score provides meaningful guidance to representative, retailers, direct sale distribution for management advice, for example, on how messed up a given store is, which store to go visit, which store to spend more time, which part of store has problems and needs attention, even if a planogram is not available.

In some embodiments, responsive to receiving profit potential score scores (e.g., a target profit potential score and an actual profit potential score) for a product and/or a profit potential comparison score for an entire shelf, the classification module 207 extracts, from the data stream, a portion of data including a received image of realogram, an image of the planogram (optional), locations of sweet spots, locations of products, etc., and associates the extracted data along with the profit potential scores and/or profit potential comparison score to the profit potential condition. In some embodiments, the classification module 207 stores the extracted data, the profit potential score, the profit potential comparison score in the data storage 243 and retrieves the data on an as needed basis. Responsive to retrieving the data, the classification module 207 associates the extracted data along with the profit potential score and/or the profit potential comparison score to the profit potential condition.

In some embodiments, the classification module 207 determines a contiguous product condition from the data stream and extracts a portion of data from the data stream based on the contiguous product condition. The classification module 207 determines the contiguous product condition based on a contiguous product score. In some embodiments, the scorer 208 calculates the contiguous product score (CPS) to measure the difference between a realogram and a planogram when two or more products are intended to be next to each other, for example, razors with razor blades.

The contiguous product score can be used by category managers to assess performance of the category and SKU level performance for assortment decisions.

The fundamental idea for calculating the contiguous product score is that two products together will sell better than two products being widely placed apart when the two products form a specific SKU pair or are part of a SKU cluster. For example, the sales may be reduced if razor and razor blades are widely spread apart, where the razor and razor blades belong to a SKU cluster including razor, shaving cream, razor blades, etc. The SKU pair and the SKU cluster may be determined by users (e.g., by analyzing customer purchase, etc.). The scorer 208 calculates the contiguous product score to determine if two products should be together, and how far apart the two products are when they are not together.

In some embodiments, the scorer 208 calculates the contiguous product score as follows:

$$CPS = \frac{w1 \times \text{Shelf Score}_N + w2 \times \text{Distance Score}_N}{2} \quad (5)$$

The contiguous product score in Equation 5 is a weighted average of the Shelf Score$_N$ and the Distance Score$_N$ of a product, where the weights w1 and w2 are determined by users. Here, when calculating the contiguous product score, the scorer 208 measures the Shelf Score$_N$ and the Distance Score$_N$ based on distances from a partner product in the SKU pair or cluster that neighbors the product. In some embodiments, the Shelf Score$_N$ and the Distance Score$_N$ range from 0 to 100. For example, if a partner product is on the top shelf of a three shelf unit, the scorer 208 obtains a Shelf Score$_N$ of 100 when the product is also on the top shelf, and obtains a Shelf Score$_N$ of 0 when the product is on the bottom shelf. Suppose the maximal distance between two products within a shelf is eight slots. If the product is at the slot(s) next to the partner product, the scorer 208 obtains a Distance Score$_N$ of 100. If the product is eight slots away (e.g., at the farthest location), the scorer 208 obtains a Distance Score$_N$ of 0.

Figure 5:
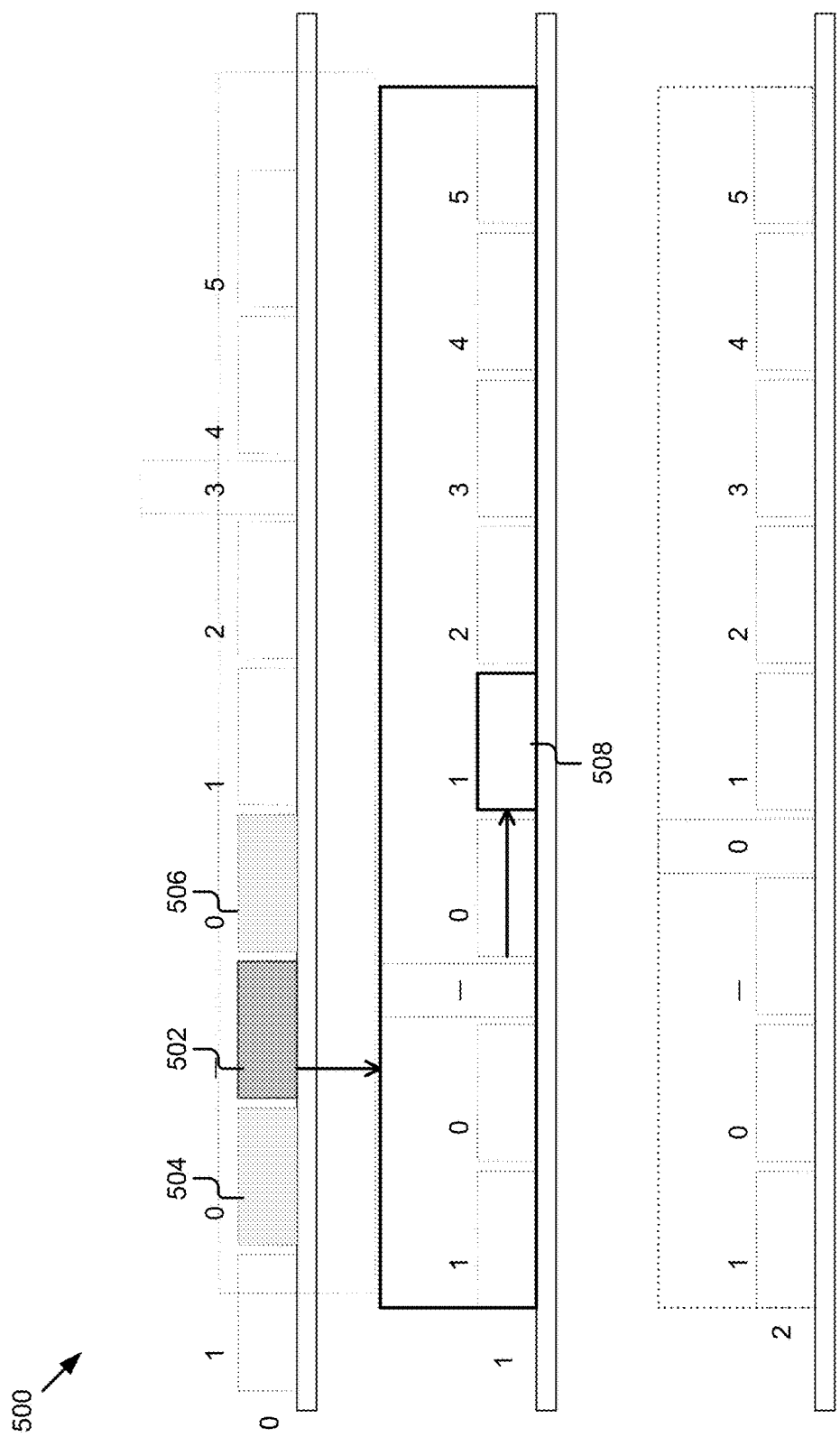
FIG. 5 depicts a graphical representation of an example illustrating the calculation of a contiguous product score according to an embodiment.

FIG. 5 depicts a graphical representation 500 of an example illustrating the calculation of a contiguous product score. Slot 502 in grey is where a partner product (e.g., a razor blade) of a product (e.g., a razor) is, which means that the expected location of the product (e.g., the razor) is either slot 504 or slot 506 that neighbors slot 502. The product is actually found in slot 508. The scorer 208 determines the Shelf Score$_N$ of 50 for the product in slot 508 since it is one shelf off from slot 506 (e.g., using Equation 3a). The scorer 208 determines the Distance Score$_N$ of 87.5 (e.g., using Equation 2) for the product in slot 508 since it is one position off from slot 506. The scorer 208 then calculates a contiguous product score for the product using the Shelf Score$_N$ and Distance Score$_N$. If a user cares more about whether the product and the partner product are widely spread within a shelf than whether they are on the same shelf, the user may assign w2 associated with the Distance Score$_N$ to be larger than w1 associated with the Shelf Score$_N$ in Equation 5. In the example of FIG. 5, assuming that w1 and w2 equal 1, the scorer 208 calculates the contiguous product score to be $$CPS = \frac{1 \times 50 + 2 \times 87.5}{2} = 67.5$$

In some embodiments, the scorer 208 assigns a threshold score based on user input to define "close enough." In the binary case, a product is determined to be close enough to its partner product when the contiguous product score for the product satisfies the threshold score, and the product is not contiguous to its partner product when the contiguous product score for the product does not satisfy the threshold score. In other cases, the threshold score indicates how far the product is from its partner product. For example, if the contiguous product score for a product satisfies a first threshold score, the product is close enough.

In some embodiments, the scorer 208 may include the contiguous product score in the planogram adherence score calculation, such that the planogram adherence score can take into account product contiguity. In some embodiments, the scorer 208 uses Equation 1b to calculate the planogram adherence score with the contiguous product score in place of the Item Score. If there is no planogram, the scorer 208 can calculate a planogram adherence score based on ignoring absolute placement (e.g., the Item Score) and focusing on contiguity (e.g., the contiguous product score). In other embodiments, the scorer 208 uses both the Item Score and the contiguous product score to calculate the planogram adherence score. For example, the scorer 208 determines an item contiguity score (ICS) using the equation $$ICS = \frac{(w1 \times \text{Item Score} + w2 \times CPS)}{2} \quad (6)$$

The scorer 208 then calculates the planogram adherence score based on the item contiguity score. Here w1 and w2 are user-determined weights. A shaving category manager may want to give a relatively high weight to the contiguous relationship (i.e., the contiguous product score) because it is very important compared to the absolute distance. On the other hand, the cereal category manager may consider the contiguous relationship as irrelevant, and assign a zero weight to the contiguous product score.

In some embodiments, responsive to receiving a contiguous product score for a product, the classification module 207 extracts, from the data stream, a portion of data including a received image of realogram, an image of the planogram (optional), SKU pairs, SKU clusters, locations of partner products, locations of products, etc., and associates the extracted data and the contiguous product score with the contiguous product condition. In some embodiments, the classification module 207 stores the extracted data and the contiguous product score in the data storage 243 and retrieves the data on an as needed basis. Responsive to retrieving the data, the classification module 207 associates the extracted data and the contiguous product score with the contiguous product condition.

In some embodiments, the classification module 207 determines a representative performance condition from the data stream and extracts a portion of data from the data stream based on the representative performance condition. The classification module 207 determines a representative's performance condition based on an influence score, a corrective actions score, and other scores. The scorer 208 calculates these scores to represent multiple aspects of retail execution and to provide the measurement of representative's performance, identification of relative levels of representative performance, and ranking of representatives. These scores can be used by managers to decide which representatives need remedial assistance, which representatives should be praised, etc. These scores can also be used by representatives to get a good sense of key aspects of their own performance.

In some embodiments, the scorer 208 calculates the influence score, the corrective actions score, and other scores for a representative based on what the representative is responsible for. In some embodiments, the scores are separated by brand, retailer, region, city, etc., based on determining how responsibility of the representative is separated. In some embodiments, each of the scores ranges from 1 to 100. The score of 100 represents the best scenario.

In some embodiments, the scorer 208 calculates an influence score (IS) to describe how well aligned the realogram is to the planogram over time and to represent the influence a representative has on the realogram. A representative may visit a store once a week for a couple of hours. In between visits by the representative, shoppers and store staff are changing the shelves in the store. Upon each store visit, the representative is responsible for realigning the shelf and working with store staff to ensure issues on the shelf are regularly addressed. Therefore how well a planogram performs over time in the store is under the influence of the representative, which is indicated by the influence score of the representative. In some embodiments, the scorer 208 calculates the influence score as follows:

$$IS = \frac{w1 \times SoS \text{ performance} + w2 \times PAS \text{ average}}{2} \quad (7)$$

where w1 and w2 are user defined weights. Share of Shelf (SoS) performance is an indication of how closely a product matches the target Share of Shelf and is calculated as follows:

$$SoS \text{ performance} = \frac{\text{Average } SoS}{\text{Target } SoS} \times 100 \quad (8)$$

In Equation 7, the influence score is an arithmetic mean of a Share of Shelf and a planogram adherence score average. In one embodiment, the scorer 208 calculates the Share of Shelf relative to a target Share of Shelf and based on a given trailing time window. The Target Share of Shelf is a percentage of shelf space that a brand, a retailer, a region, etc., is expected to have (e.g., based on a planogram). For example, a target Share of Shelf of 0.62 indicates that a brand is expected to have 62% of the shelf space included in a planogram. The Average Share of Shelf is an average of measured Share of Shelf scores during the given trailing time window. In the above example, if the actual Share of Shelf of the brand is measured weekly and the time window is four weeks, the scorer 208 calculates the average Share of Shelf as follows:

$$\frac{0.57 + 0.64 + 0.6 + 0.59}{4} = 0.6$$

The average Share of Shelf of 0.6 indicates that the brand actually has 60% of the planogram on average over the four-week window. Using Equation 8, the scorer 208 Share of Shelf Performance $$SoS \text{ performance} = \frac{0.6}{0.62} \times 100 = 67.7$$

In this example, the average Share of Shelf being 2% off the target Share of Shelf gives a Share of Shelf of 67.7, which indicates a general good performance over a four-week window. Depending on different time windows, the influence score varies. The scorer 208 may calculate a higher influence score for a representative in September than in August. The higher the influence score, the better the performance of a representative on the metrics measured.

The scorer 208 also calculates planogram adherence score scores using Equation 1a or 1b and obtains the planogram adherence score average by averaging the planogram adherence scores over the given trailing time window. The scorer 208 calculates the influence score based on the Share of Shelf and the average planogram adherence score using Equation 7. In some embodiments, in addition to the Share of Shelf and the average planogram adherence score, the scorer 208 also aggregates other information to calculate the influence score. For example, the scorer 208 may determine a score to measure a degree of the out-of-stock products being reduced over the given time window (e.g., based on the number of stockouts, the frequency of recurring stockouts, etc.), and factor this score into the calculation of the influence score. Therefore, given the Share of Shelf and the average planogram adherence score being the same, the scorer 208 may compute a higher score for a first field representative than for a second field representative since stockouts in the working area of the first field representative is low while a number of stockouts in the working area of the second field representative is identified during the given time window. This score may be threshold-based, for example, a higher or lower score is determined when the number of stockouts being reduced over a time period is above or below a threshold. This score is determined based on the out-of-stock information, and is used to measure the reps ability to manage and/or reduce out-of-stock situations over time. For example, a low score may signal that a representative should work together with store management to change order frequency or order quantity to solve the frequent out-of-stock problem. Or a high score may indicate that the out-of-stock is trending down over time or are already at a low level.

In some embodiments, the scorer 208 calculates a corrective actions score (CAS) to describe how completely a representative corrects issues on store shelves (fixes store conditions in alignment with corrective actions provided to the representative). If a corrective action on a shelf was identified in the first visit of a representative, the same corrective action should not be identified in a subsequent visit of the representative. Whether an identical corrective action persists between visits indicates the representative's follow-through and performance with respect to shelf conditions. In some embodiments, the scorer 208 calculates the corrective actions score as follows:

$$CAS = 100 - \frac{\text{\# of repeating corrective actions}}{\text{total \# of corrective actions}} \times 100 \quad (9)$$

According to Equation 9, the corrective actions score would be 100 if all the corrective actions identified and shared with a representative in a visit have been performed before the subsequent visit (i.e., zero reported corrective actions are repeating), while the corrective actions score would be zero if nothing has been done on the identified corrective actions before the subsequent visit. In some embodiments, the calculation of the corrective actions score only counts a single visit and a single subsequent visit. In some embodiments, the scorer 208 measures the corrective actions score against the information exposed to a representative rather than against the information that was not exposed to the representative. If a representative was informed of 12 of 20 corrective actions found in a first visit, the scorer 208 counts how many actions out of the 12 exposed actions have been performed before the subsequent visit, and calculates the corrective actions score with a total number of corrective actions as the 12 exposed actions. In other embodiments, the scorer 208 determines a bonus corrective actions score for a representative if the representative addresses unexposed actions prior to a subsequent visit.

In some embodiments, the scorer 208 determines a corrective actions score based on correction of a corrective action relating to hidden out-of-stocks. The scorer 208 measures whether a hidden out-of-stock appears in the first visit. If the hidden out-of-stock at the certain position of a shelf in a visit appears again in a subsequent visit, this is negative to the score of a representative. The scorer 208 also measures whether a same missing facing repeats on each visit. For example, two facings of a product or a SKU are supposed to be displayed on a shelf. If only one facing was displayed in a visit, and still one facing is displayed in the subsequent visit, the scorer 208 reduces the corrective actions score of the representative based on this negative result.

In some embodiments, in addition to the corrective actions score, the scorer 208 also calculates other scores to measure the follow-through on the corrective actions that a representative was given based on measuring if a problem still exists in subsequent visits. The classification module 207 determines the representative performance condition using the influence score, the corrective actions score, and other representative performance scores generated by the scorer 208.

In some embodiments, the classification module 207 determines a promotional adherence condition from the data stream and extracts a portion of data from the data stream based on the promotional adherence condition. In some embodiments, the classification module 207 determines the promotional adherence condition based on a promotion discount adherence score. In some embodiments, the promotion discount adherence score (PDAS) is a measure of a target discount of a product (e.g., as suggested and reimbursed by the product manufacturer) to an actual discount of the product. The promotion discount adherence score can be used by category managers and trade promotions managers for negotiations on promotions or retroactive adjustments to promotion payments.

In some embodiments, the scorer 208 calculates the promotion discount adherence score as follows:

$$PDAS = 100 - \frac{\text{target discount} - \text{measured discount}}{\text{target discount}} \times 100 \qquad (10)$$

Here, the measured discount indicates a discount level at the time of measurement for a SKU. The target discount is a discount agreed with retailers for a specific promotion. The target discount may be time specific. In some embodiments, the measured discount is based on a price captured from a store at the time of measurement for a specific SKU. For example, the image processing module 203 detects a price label on a shelf corresponding to a SKU and identifies a price from the price label. The scorer 208 retrieves the price associated with the SKU from the data stream, and uses the retrieved price as the current price. The retrieved price can then be used with a non-promotional price to determine the measured discount.

A promotion discount adherence score of 100 represents that the actual discount measured in a store is consistent with the target discount over this specific time. In some embodiments, the scorer 208 also assigns the promotion discount adherence score to be 100 when the measured discount is greater than the target discount. Typically, consumer package goods companies enter into trade promotion arrangements with retailers. If a product is normally sold for $10 and the agreed discount is $1, the consumer package goods company may reimburse the retailer for this $1 based on a claim from the retailer. However, if the actual discount the retailer gave to a purchaser is 50 cents instead of $1, and the retailer claims $1 to the consumer package goods company, the claim is inappropriate because the retailer benefits from the advertising behind the promotion but failed to provide consumers with the agreed discount. In such a case, the promotion discount adherence score is useful. First, based on the promotion discount adherence score, the consumer package goods company can identify and fix a problem before the promotion is over. Second, the promotion discount adherence score provides information of the problem to the finance department for further discussion or actions. For example, a promotion discount adherence score less than 100 indicates that the finance department should give a lower credit to the retailer based on actual discounts given to customers.

In some embodiments, the classification module 207 determines a relative price adherence condition from the data stream and extracts a portion of data from the data stream based on the relative price adherence condition. In some embodiments, the classification module 207 determines a relative price adherence condition based on a relative SKU price adherence score. The relative price adherence score (RPAS) measures a price ratio between a SKU to other SKUs. The scorer 208 may calculate an relative price adherence score for every SKU within a category and determine whether a specific SKU is overpriced or underpriced compared to other SKUs. In some embodiments, the scorer 208 calculates the relative price adherence score for a given SKU as follows:

$$RPAS = 100 - \frac{\sqrt{\sum_{1}^{n}((\text{target ratio} - \text{actual ratio})^2)}}{n} \times 100 \qquad (13)$$

The target ratio is the expected price ratio between the given SKU and all other SKUs. The actual ratio is the measured price ratio between the given SKU and all other SKUs. In equation 13, there are n other SKUs, where n is a positive integer. In some embodiments, the scorer 208 receives a user determined target ratio and calculates an actual ratio based on the prices of SKUs found on a shelf. The scorer 208 takes the absolute value of the difference between the target ratio and the actual ratio for all SKU pairs (e.g., n pairs), and averages the differences for all SKUs found on the shelf. The scorer 208 normalizes the average to a range between 0 and 100 and uses the normalized average as the relative price adherence score.

Figure 6:
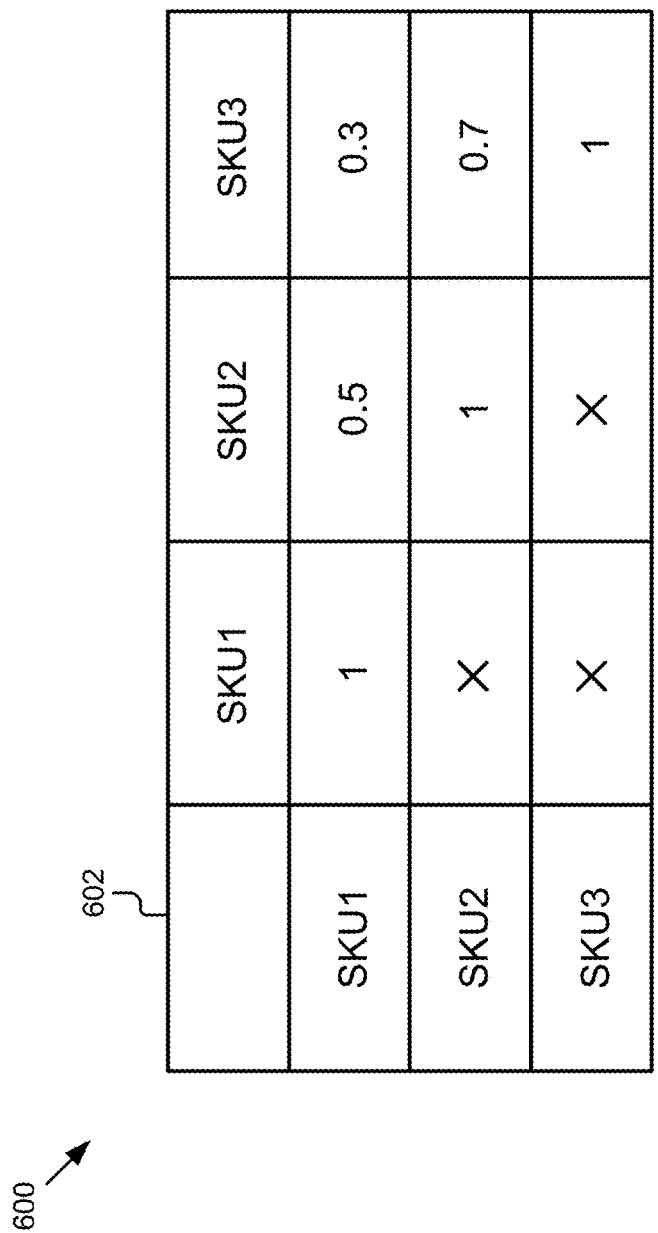
FIG. 6 depicts a graphical representation of an example target price ratio table between all SKUs according to an embodiment.

FIG. 6 depicts a graphical representation 600 of an example target price ratio table between all SKUs. In the example of FIG. 6, the 3×3 pair-wise table 602 shows that every SKU is compared with two other SKUs (i.e., n=2). The scorer 208 uses two of the three target ratios in table 602 to calculate a relative price adherence scorescore (e.g., the target ratio 0.5 between the first and second SKUs, the target ratio 0.3 between the first and second SKUs, and the target ratio 0.7 between the second and third SKUs). For the first SKU, the scorer 208 compares 0.5 to the actual ratio between the first and second SKUs, and compares 0.3 to the actual ratio between the first and third SKUs. The scorer 208 measures the price ratio differences between the first SKU and other SKUs, and calculates a relative price adherence score for the first SKU. Similarly, the scorer 208 calculates an relative price adherence score for the second SKU based on comparing 0.5 and 0.7 to corresponding actual ratios, calculates an relative price adherence score for the third SKU based on comparing 0.3 and 0.7 to corresponding actual ratios SKUs.

A relative price adherence score for a SKU highlights products with significant pricing ratio variance, and therefore can be used by category managers and trade promotions manager to assess performance of the category overall and to assess whether retailers are pricing the various SKUs within a category correctly. For example, a retailer may misprice a product (e.g., make a bargain-based product relatively expensive and/or make a premium product underpriced), which will interfere the profitability for the retailer and the consumer package goods company. In such case, the scorer 208 may generate an relative price adherence score that is below a threshold. The relative price adherence score value signals that a store is not performing as expected, and indicates that the retailer needs to optimize pricing to increase the performance of the shelf and increase the sales overall.

Returning to FIG. 2, the suggestion module 209 may include software and/or logic to provide the functionality for generating a suggestion based on the condition determined from the data stream.

The suggestion module 209 receives a condition and a portion of data associated with the condition from the classification module 207 and generates one or more suggestions based on the condition. In some embodiments, a suggestion is advice for performing an action. In other embodiments, a suggestion is a notification. In some embodiments, the notification identifies the condition and the portion of data associated with the condition. In other embodiments, the notification is an alert for a user to deal with situations where a variance from a norm is significant and/or where a boundary event occurs. The variance is significant, for example, when a small number of items are misplaced in the farthest positions from their right positions. In this case, the overall distance from the right positions may be trivial but the overall variance may be significant. The boundary event occurs, for example, when a large number of items are misplaced and a score measured based on the distances is below a predefined threshold.

In some embodiments, the suggestion module 209 receives an out of stock condition and generates advice for performing an action based on the out of stock condition. For example, the suggestion module 209 generates advice for finding the missing products from the inventory and replacing voids of a shelf with the missing products. For a hidden out of stock condition, the suggestion module 209 may also generate advice for relocating the misplaced products. Responsive to out of stock conditions determined over time (e.g., repetition of stockouts), the suggestion module 209 may suggest a discussion about whether to change the product order or the order frequency. In other embodiments, the suggestion module 209 also generates an alert if the number of missing products satisfies a threshold number, the time interval that the repetition of stockouts has lasted satisfies a threshold time, etc.

In some embodiments, the suggestion module 209 receives a product recall condition and generates advice for performing an action based on the product recall condition. For example, the suggestion module 209 generates advice for pulling recalled products from the shelves and from store inventory. In other embodiments, the suggestion module 209 also generates an alert based on an overdue time for dealing with the product recall condition.

In some embodiments, the suggestion module 209 receives a position map condition and generates advice for performing an action based on the position map condition. For example, the suggestion module 209 generates advice for repositioning a product. In other embodiments, responsive to receiving the position map condition and a portion of data associated with the position map condition, the suggestion module 209 may also generate a notification describing potential usage of the portion of data. For example, the suggestion module 209 generates a notification notifying that the portion of data should be merged with sales volume and profit data such that repositioning of products is based on overall shelf profit and is automatic. The suggestion module 209 may also notify that the portion of data can be used to generate feedback to in-store stockers or the portion of data should be compared against sales data to determine how it impacts the sales data.

In some embodiments, the suggestion module 209 receives a new product condition and generates advice for performing an action based on the position map condition. For example, the suggestion module 209 generates advice for capturing additional information of the unindexed product, updating the data stream with the additional information, and adding the additional information to the database for indexing the product. In other embodiments, responsive to receiving the new product condition and a portion of data associated with the new product condition, the suggestion module 209 may also generate a notification. For example, the suggestion module 209 generates a notification about the presence of the new product for purpose of competitive awareness and tracking, or generates a notification about how the portion of data is related to making a business plan.

In some embodiments, the suggestion module 209 receives a planogram adherence condition determined based on a planogram adherence score. The suggestion module 209 generates a notification of the planogram adherence score. The suggestion module 209 may also generate advices for users based on the planogram adherence score. Depending on whether the previous planogram adherence score is low (for example, compared to a threshold) and whether the planogram adherence score trend indicates a persistent low planogram adherence scores for a certain time period, the advice can suggest how long the representative should spend in the store on his or her next visit. In another example, for a representative manager who wants to understand potential issues in the area and categories his or her team covers, the suggestion module 209 can suggest a meeting with a responsible representative based on low planogram adherence score scores, downward trends, and/or high variability in planogram adherence score.

In some embodiments, the suggestion module 209 generates the suggestion for users based on the planogram adherence score in conjunction with other data. For the above examples, the suggestion module 209 generates another suggestion for the representative and the representative manager based on sales data. If the sale results are good regardless of low planogram adherence score, the suggestion module 209 may change the visit time and the necessity of a conversation. In another example, for a category manager who wants to understand why a category has recently begun to perform poorly within a region or retailer, the suggestion module 209 generates advice for the category manager based on point-of-sale (POS), supply chain, out of stock data, promotion adherence, and planogram adherence. In yet another example, in the event a trade promotion is not delivering the sales uplift intended, the suggestion module 209 generates advice for a trade promotion manager to examine the planogram adherence score and other information to see if the planogram adherence can explain poor results. The other information may not be related to the planogram adherence indicated by the planogram adherence score, for example, it is possible that under-expected price discounts and/or failure to follow through on special displays are the cause of poor trade promotion results.

In other embodiments, the suggestion module 209 also generates an alert when the planogram adherence score is low (e.g., below a threshold score), when the planogram adherence score is on a consistent downturn (e.g., over at least a threshold time period), and/or when the planogram adherence score for a given category has high variability (e.g., when healthy cereals and regular cereals are placed on the shelves where only the healthy cereals are supposed to be located).

In some embodiments, the suggestion module 209 receives a profit potential condition and generates a suggestion. The profit potential condition is determined based on a profit potential score and/or a profit potential comparison score. An actual profit potential score measures the distance between the actual position of a product and the sweet spot. A target profit potential score is a number given to a product to reflect the potential profit of the product. The profit potential comparison score for an entire shelf of SKUs measures the average differences between the actual profit potential score and the target profit potential score for every SKU on the shelf. Responsive to receiving the profit potential condition, the suggestion module 209 generates a notification of the profit potential score scores and the profit potential comparison score. In some embodiments, the suggestion module 209 generates advice for users (e.g., a representative, a representative manager, a category manager, etc.) based on the profit potential score scores. For example, when no planogram is available for a given shelf, a representative will be given advice to change the location of certain SKUs in order to optimize the profit performance of the shelf. The suggestion module 209 may suggest locations on the shelf (e.g., shelf and slot, contiguous arrangements, etc.) to the representative based on the profit potential score scores. By comparison of the profit potential score scores of individual product, the representative gets some sense about whether a product is at a location close to where the product should be to maximize performance and profit. For example, the actual profit potential score of a toothpaste that is found in the bottom right of a shelf, may be improved by moving the product to be on the eye-level of the center of the shelf (e.g., the sweet spot). The suggestion module 209 may suggest to the representative to move the toothpaste. In yet another example, if the actual profit potential score of a premium product indicates that the product is constantly placed in the bargain area of a shelf, the suggestion module 209 may suggest moving the product or adjusting the price of the product.

In some embodiments, the suggestion module 209 generates the suggestion for users based on the profit potential score scores in conjunction with other data. Responsive to receiving sales data and other data that reflect real world product performance, the suggestion module 209 may advise the category manager that the sales data can be misleading, relative to SKU level performance, if product are not displayed appropriately. The suggestion module 209 generates advice for the category manager to examine the profit potential score scores to determine whether products have been displayed correctly before making any decision. This is especially useful in situations where a planogram has not been established. In some embodiments, the suggestion module 209 also generates alerts of multiple misplaced products (e.g., above a certain threshold) on a given shelf or from a given representative and for users such as a managers of teams of representatives.

In other embodiments, the suggestion module 209 generates suggestions for users (e.g., a representative, a representative manager, a category manager, etc.) based on the profit potential comparison score. For example, the suggestion module 209 suggests, based on the profit potential comparison score, how long a representative should spend at a store to address apparent significant issues with product display for one or more categories and suggests stores that need extra attention to a representative manager. In another example, the suggestion module 209 suggests to a category manager, based on the profit potential comparison score, whether product display is a major contributing factor, or whether to look at other factors in terms of poor category performance when no planogram exists. In some embodiments, the suggestion module 209 suggests to a user, in addition to the profit potential comparison score, also compare sales data, for the entire category/shelf, before allocating store staff time to fixing an issue.

In some embodiments, the suggestion module 209 receives a contiguous product condition and generates a suggestion. The contiguous product condition is determined based on a contiguous product score. Responsive to receiving the contiguous product condition, the suggestion module 209 generates a notification of the contiguous product score. The suggestion module 209 may also generate other notifications or advice, for example, a category manager should make plans on future category/shelf arrangements based on the contiguous product score, a representative manager can determine misplacement level of SKU pairs and clusters and identify the regions that need to be fixed, etc.

In some embodiments, the suggestion module 209 receives a representative performance condition and generates a suggestion. The representative performance condition is determined based on one or more of an influence score, a corrective actions score, and other scores. For example, the suggestion module 209 generates a notification of scores and suggests a representative to look into and track these scores because they are performance measures that will be applied to him or her. The suggestion module 209 also generates a suggestion for a representative manager which employees deserve praise which underperforming employees could use assistance or training. Further, the suggestion module 209 identifies the top X percent employees and the bottom Y percent employees that may need remedial assistance or performance correction.

In some embodiments, the suggestion module 209 receives a promotional adherence condition and generates a suggestion. The promotional adherence condition is determined based on a promotion discount adherence score. Responsive to receiving the promotional adherence condition, the suggestion module 209 generates a notification of these scores. In some embodiments, the suggestion module 209 generates an alert when a promotion is underway and the agreed discount (or variance to that discount) is not being adhered to. For example, the suggestion module 209 receives user defined alert levels and generates an alert based on determining that a promotion discount adherence score is below an alert level. In some embodiments, the suggestion module 209 also generates an alert based on the analysis of the scores such that special representative/representative manager/trade promotions manager visits can be scheduled. In some other embodiments, the suggestion module 209 aggregates multiple scores in a region or store brand, identifies issues based on the aggregated scores, and automatically generates an alert for higher levels within the consumer package goods company if it is necessary to escalate to the higher levels within the consumer package goods company depending on the number of issues. The suggestion module 209 may also generate other notifications or advice. For example, when a representative is visiting a store, the suggestion module 209 communicates with the action module 211 to generate and send a suggestion on the mobile device of the representative to investigate what is happening with a given promotion when the promotion discount adherence score is substantially worse than expected. The suggestion is generated on a per store basis and sent to the representative in real time. In another example, if point of sale system data indicates that a promotion is not generating the expected sales uplift, the suggestion module 209 generates a suggestion to tell a trade promotions manager to find out the reason based on the scores (e.g., the promotion discount adherence score shows that most of the retailer stores have not applied the discount). In yet another example, the suggestion module 209 notifies the finance department that a promotion agreement has not been honored by a retailer and yet the retailer acted as if the promotion agreement had been kept (e.g., by making a reimbursement/discount claim). In some embodiments, the suggestion module 209 also receives other data such as point of sale data, supply chain data, financial system data, etc., and generates a suggestion based on both the promotion discount adherence score and other data.

In some embodiments, the suggestion module 209 receives a relative price adherence condition and generates a suggestion. The relative price adherence condition is determined based on a relative price adherence score. Responsive to receiving the relative price adherence condition, the suggestion module 209 generates a notification of the relative price adherence score and may generate other suggestions. For example, the suggestion module 209 generates advice for a representative, a representative manager, and a category manager to investigate a number of possible reasons for why a store is not performing as expected. The relative price adherence score scores for SKUs may indicate that the store is not pricing products in the right relation to each other and thus many of the products are underperforming.

The action module 211 may include software and/or logic to provide the functionality for performing an action based on the received suggestion.

In some embodiments, the action module 211 receives a suggestion (e.g., advice, notification) generated based on one or more conditions and determines one or more recipients of the suggestion. A recipient can be a representative, a representative manager, a store manager, a category manager, a product manager, a trade promotions manager, a space planner, a finance manager, a manufacture staff, etc. In some embodiments, the action module 211 determines the recipient of the suggestion based on the condition. For example, the action module 211 determines that the suggestion generated based on the new product condition should be sent to a representative. In other embodiments, the action module 211 determines the recipient for the suggestion based on the content of the suggestion. For example, the action module 211 determines that the recipients of the notification including an influence score that measures performance of a representative are the representative and a representative manager. In other embodiments, the action module 211 determines that the recipient of the suggestion is everyone, i.e., the content of the suggestion can be shared to all people in the retail environment. In some embodiments, time periods or thresholds can be used to progressively escalate the information. The action module 211 may adjust the recipient of the suggestion depending on how information is escalated. For example, as a condition persists beyond a predefined threshold time period, the action module 211 reduces the recipient of the suggestion generated based on the condition to a representative manager and a category manager.

The action module 211 transmits the suggestion to the recipient. The action module 211 also transmits to the recipient a portion of data associated with the condition based on which the suggestion was generated. The data (e.g., images, scores or other related graphical data) presented to a recipient may help the recipient easily understand the problem. For example, the recipient intuitively sees where the product is missing or misplaced from a received image. The recipient may perform an action based on the suggestion and the portion of data. Based on receiving a notification, the recipient may also use the portion of data for further analysis and make a future plan or decision based on the analysis. For example, a user can determine his or her own action to be performed based on the notification.

For example, responsive to receiving a suggestion and a portion of data determined based on the out of stock condition, a representative may get stock and replace voids, or relocate misplaced products and fix hidden stock out problem, or discuss with the store manager as whether to change the product order. Responsive to receiving a suggestion and a portion of data determined based on the product recall condition, a representative may pull the recall product from the shelves. Responsive to receiving a suggestion and a portion of data determined based on the position map condition, a representative may reposition the product. Responsive to receiving a suggestion and a portion of data determined based on the new product condition, a representative may capture additional information of an unindexed product and update the data stream and a database with the additional information.

Responsive to receiving a suggestion and a portion of data determined based on the planogram adherence condition, the action module 211 determines that the recipient can be a representative, a representative manager, a category manager, or a trader promotions manager, and transmits the suggestion generated based on the planogram adherence scores associated with the planogram adherence condition to the recipient for performing an action. For example, if a representative determines that a store typically has good planogram adherence scores on two categories but not on a third category, the representative begins his or her visit at the third category with poor planogram adherence score. Or the representative may manage store visits based on planogram adherence scores by visiting stores with worse planogram adherence score more often. In another example, the analysis of planogram adherence scores (usually on an exception basis, related to unusually negative results) triggers a representative manager to have a conversation with a responsible representative and/or with store staff. The representative manager uses the planogram adherence score information as part of their planning for the discussions. In yet another example, if planogram adherence issues represented by planogram adherence scores are found to be correlated with poor sales or poor trade promotion results, a category manager or a trade promotions manager might work with representative managers and retail chain management to address the issue.

Responsive to receiving a suggestion and a portion of data determined based on the profit potential condition, the action module 211 determines that the recipient can be a representative, a representative manager, or a category manager, and transmits the suggestion generated based on the profit potential scores and/or profit potential comparison scores associated with the profit potential condition to the recipient for performing an action. In some embodiments, the action module 211 transmits a suggestion to a recipient for performing an action based on the profit potential scores. For example, based on the profit potential scores, a representative may change locations of one or more products on a shelf to place products together, a representative manager may decide whether representatives and/or a category manager may decide whether, stores, chains, etc., are doing a good job with general placement, and if not, engage the relevant party in discussions for making improvements. In another example, when a category manager realizes that a certain SKU is not well received by the market based on reports over a period of time, the category manager analyzes the data including the profit potential score to determine whether the issue is with the product itself or whether store conditions/merchandising (e.g. the fact that the product is regularly placed in positions on the shelf which are not appropriate for it) has influenced the results. As a result, the category manager can work with field representative managers, representatives, and direct sales distributors to solve the problem. In other embodiments, the action module 211 transmits a suggestion to a recipient for performing an action based on the profit potential comparison score. For example, based on the profit potential comparison score, a representative may decide to allocate more time to a given store visit in order to work with store staff and realign an entire category/shelf, and a representative manager may assign a representative to work on a specific shelf problem when sales are poor and shelf problems are demonstrated through the profit potential score and profit potential comparison score.

Responsive to receiving a suggestion and a portion of data determined based on the contiguous product condition, the action module 211 determines that the recipient can be a representative, a representative manager, or a category manager, and transmits the suggestion generated based on the contiguous product score associated with the contiguous product condition to the recipient for performing an action such as relocating products, changing product orders or frequencies, etc.

Responsive to receiving a suggestion and a portion of data determined based on the representative performance condition, the action module 211 determines that the recipient can be a representative and a representative manager, and transmits the suggestion associated with the representative performance condition generated based on the influence score, corrective action scores, and/or other scores to the recipient for performing an action. For example, if a representative sees that on one score his or her performance score is in the 25 percentile and makes the decision that he or she needs to make improvements, the representative can choose whether to talk with the manager and/or peers on how to best succeed. If, on the other hand, the representative sees that his or her performance is in the 70% percentile on a second score he or she can decide to focus most attention on improvement of the first score. In another example, a representative manager reviews scores and, where appropriate, discusses performance issues and constructs remediation plans with a representative when performance is poor. Based on the scores, the representative manager can also identify top performing representatives and ensure their compensation, bonus, rewards of other sorts, are commensurate with their performance. Whenever possible, the representative manager may try to learn how these top performing representatives achieve more than their peers and see if their techniques can be replicated by their peers.

Responsive to receiving a suggestion and a portion of data determined based on the promotional adherence condition, the action module 211 determines that the recipient can be a representative, a trade promotions manager, or finance department, and transmits the suggestion associated with the promotional adherence condition to the recipient for performing an action. For example, responsive to receiving an alert of a promotion failing to reach the expected sales uplift, a representative may work together with store management to get the situation corrected. If the score included in the alert shows that promotion is not going well because most of the retailer stores have not applied the promotion, a trade promotions manager can contact the chain's management and plan to adjust the promotion. The trade promotions manager can also inform the finance department that the financial terms of the agreement were modified and instructs the finance department not to allow claims under the original terms. In some cases, the action module 211 may forward an alert directly the finance department for responding such situation. Finally, the trade promotions manager can contact all of the representative managers to apply greater vigilance in reviewing the promotion going forward. The finance department can adjust the "claim" made by the retailer and contact the retailer for a discussion. Once the finance department determines an inappropriate submission of a claim, e.g., when responding the trade promotions manager in the above scenario, or when receiving a claim with a typo error, or in some other cases, the finance department can also alert the trade promotions manager, the representative manager, and the representative of the inappropriate submission of the claim and a reason why the claim is inappropriate.

Responsive to receiving a suggestion and a portion of data determined based on the relative price adherence condition, the action module 211 determines that the recipient can be a representative, a representative manager, or a category manager, and transmits the suggestion associated with the relative price adherence condition to the recipient for performing an action. For example, the category manager may arrange for store management to discuss the target audiences for each product and the rationale behind the relative prices for each product to maximize profit while not engaging in any supplier/retailer price fixing.

In some embodiments, the action module 211 receives acknowledgement that a recipient has performed a first action based on the advice and notification, and performs a second action based on the acknowledgement. For example, the action module 211 receives an image from a representative showing the recall products having been removed from the shelves, and generates and sends a notification to the manufacture staff about the completion of the recall. In another example, the action module 211 receives acknowledgement of price adjustment and triggers the update of the data stream, e.g., the image processing module 203 receives an image of the new price tags, and the data stream generator 205 adds the image to the data stream.

The user interface engine 213 may include software and/or logic for providing user interfaces to a user.

In some embodiments, the user interface engine 213 receives instructions from the image processing module 203 to generate a graphical interface that instructs the user to capture an image of a retail shelf stocking products. In some embodiments, the user interface engine 213 generates a graphical image for displaying the advice and notification. In some other embodiments, the user interface engine 213 receives instructions from the classification module 207, the suggestion module 209 and the action module 211 to generate a graphical guide, for example, overlays on real store images, for display to a merchandising representative and/or other staff to quickly identify and solve a problem. Or the user interface engine 213 may communicate with modules/engines 207-211 to provide a near augmented reality tool to representatives. The tool includes intuitive and clear instructions that direct representatives to perform an action to address a problem. In other embodiments, the user interface engine 213 sends the graphical user interface data to an application (e.g., a browser) in the client device 115 via the communication unit 241 causing the application to display the data in a user interface.

Figure 7:
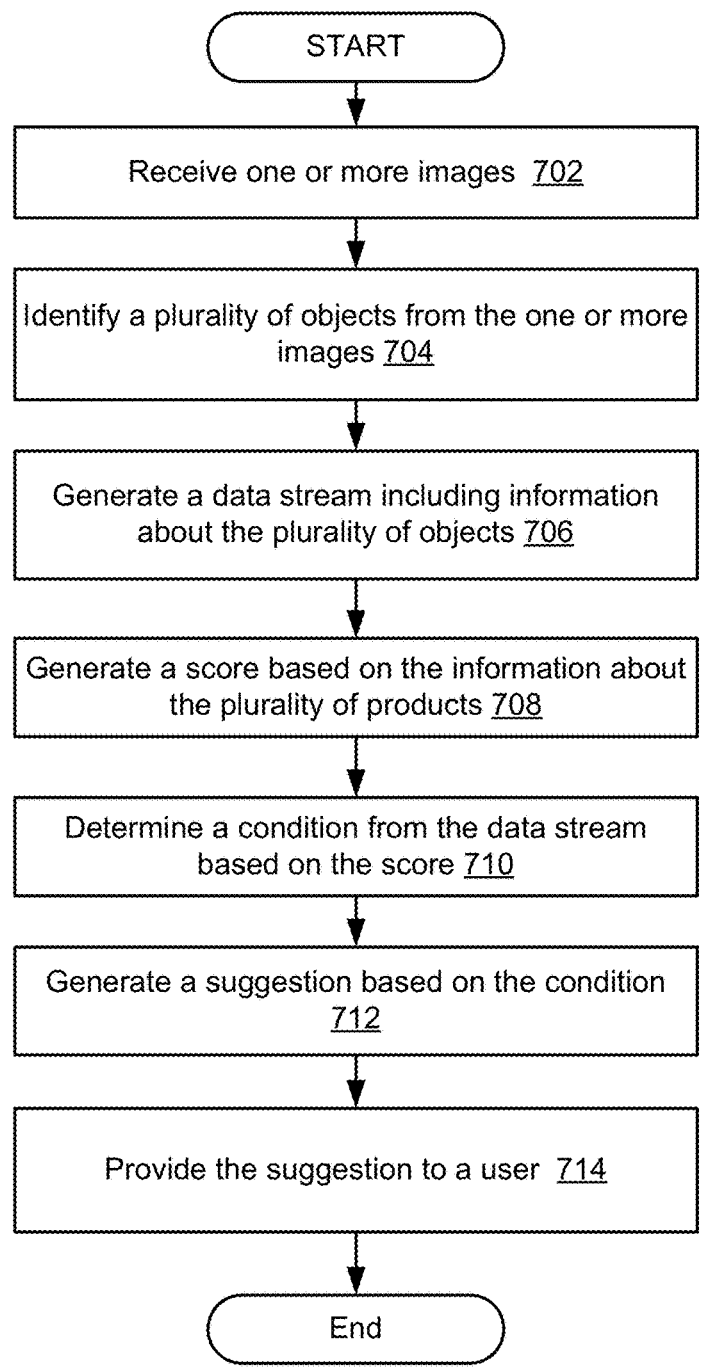
FIG. 7 is a flow diagram illustrating one example embodiment of a method for generating an advice for performing an action based on a condition.

FIG. 7 is a flow diagram 700 illustrating one embodiment of a method for generating an advice for performing an action based on a condition. As described above, the image recognition application 103 may include an image processing module 203, a data stream generator 205, a classification module 207, a suggestion module 209, and an action module 211. At 702, the image processing module 203 receives one or more images. At 704, the image processing module 203 identifies a plurality of objects from the one or more images. In some embodiments, the image processing module 203 identifies objects in the one or more images based on extracting features from the one or more images and matching the extracted features to those features stored in the database for recognition. In other embodiments, the image processing module 203 determines one or more unindexed objects from the one or more images, where information of the unindexed objects does not match information stored in the database. At 706, the data stream generator 205 generates a data stream including information about the plurality of objects. The object information may include an object identifier, one or more associated images, a location of an object, metadata related to the object, etc.

At 708, the scorer 208 generates a score based on the information about the plurality of products. At 710, the classification module 207 determines a condition from the data stream based on the score. In some embodiments, the condition can be one of the group of a regular out of stock condition, a hidden out of stock condition, a product recall condition, a position map condition, a new product condition, a promotional adherence condition, a representative performance condition, a planogram adherence condition, and a profit potential condition. At 712, the suggestion module 209 generates a suggestion based on the condition. At 714, the action module 211 provides the suggestion to a user.

Figure 8:
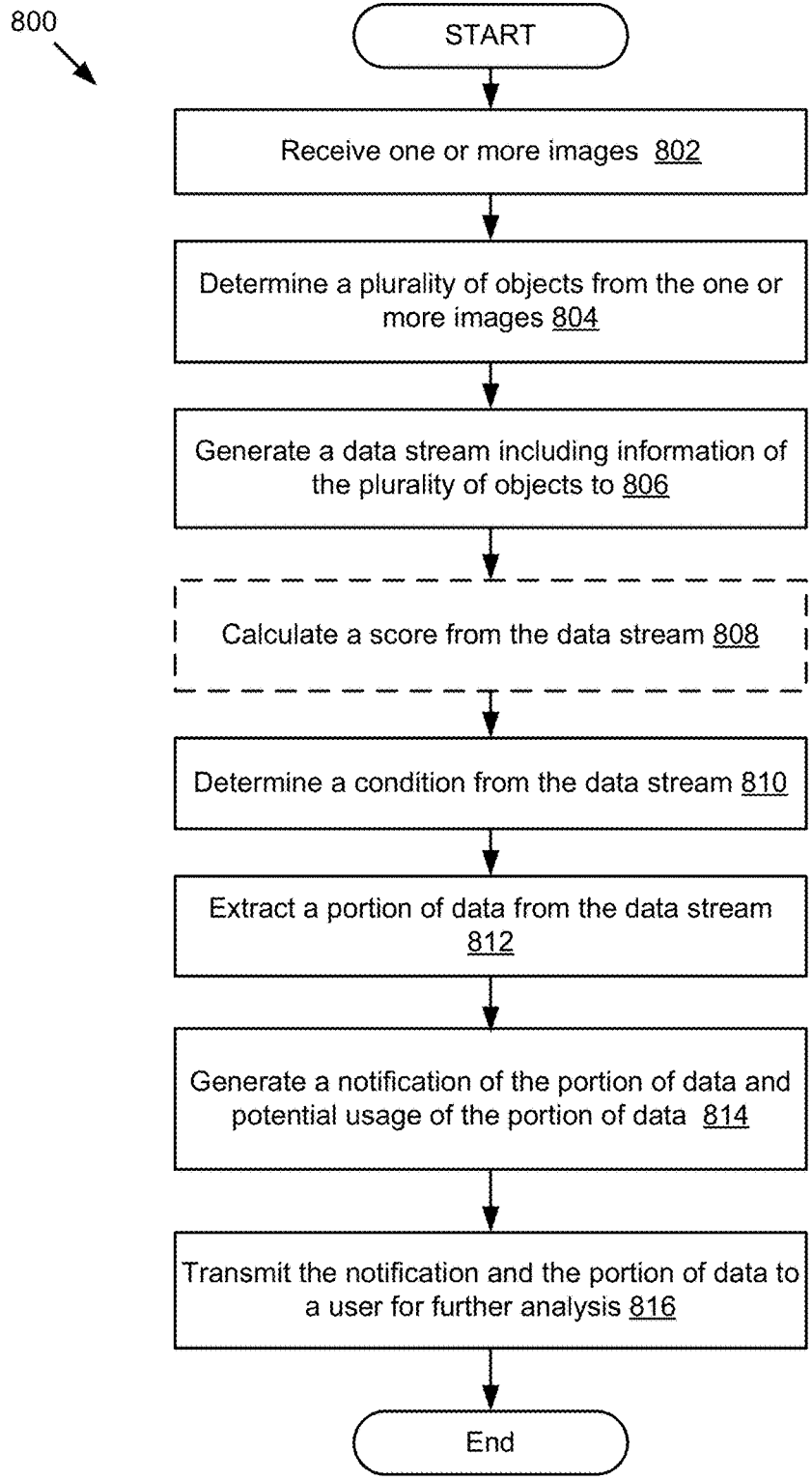
FIG. 8 is a flow diagram illustrating one example embodiment of a method for generating a notification describing potential usage of a portion of data associated with a condition.

FIG. 8 is a flow diagram 800 illustrating one embodiment of a method for generating a notification describing potential usage of a portion of data associated with a condition. As described above, the image recognition application 103 may include an image processing module 203, a data stream generator 205, a classification module 207, a suggestion module 209, and an action module 211. The classification module 207 may include a scorer 208. At 802, the image processing module 203 receives one or more images. At 804, the image processing module 203 determines a plurality of objects from the one or more images. At 806, the data stream generator 205 generates a data stream including information of the plurality of objects. At 808, the scorer 208 calculates a score from the data stream. For example, the score can be a planogram adherence score, a contiguous product score, a relative SKU price adherence score, etc. Each score is used to determine a condition. The dashed line indicates this step is optional. At 810, the classification module 207 determines a condition from the data stream. At 812, the classification module 207 extracts a portion of data from the data stream. At 814, the suggestion module 209 generates a notification notifying the portion of data and describing potential usage of the portion of data. At 816, the action module 211 transmits the notification and the portion of data to a user for further analysis. For example, the suggestion module 209 generates a notification notifying the presence of a new product for purpose of competitive awareness and tracking, or notifying that the portion of data may be used in making a business plan.

Figure 9:
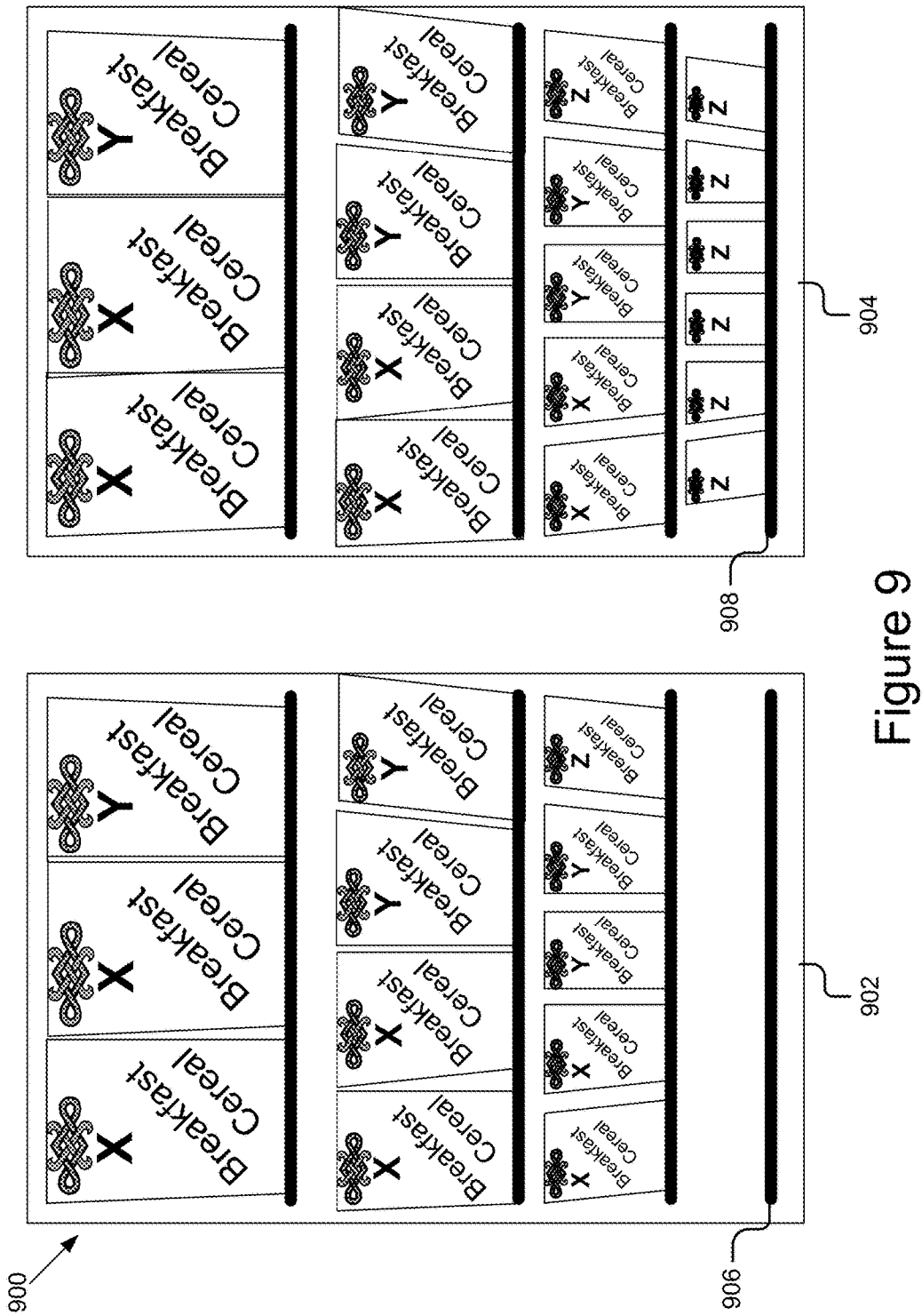
FIG. 9 is a graphical representation of an example out of stock condition according to one embodiment.

FIG. 9 is a graphical representation 900 of an example out of stock condition. Images 902 and 904 depict shelves of a store before and after adjustment. The classification module 207 determines an out of stock condition, for example, based on identifying voids on the bottom shelf 906 of image 902. The suggestion module 209 generates advice for a representative to get stock of the product and replace voids of the bottom shelf 906 with the missing product. As a result, a number of products are placed on the bottom shelf 908 as shown in image 904.

Figure 10:
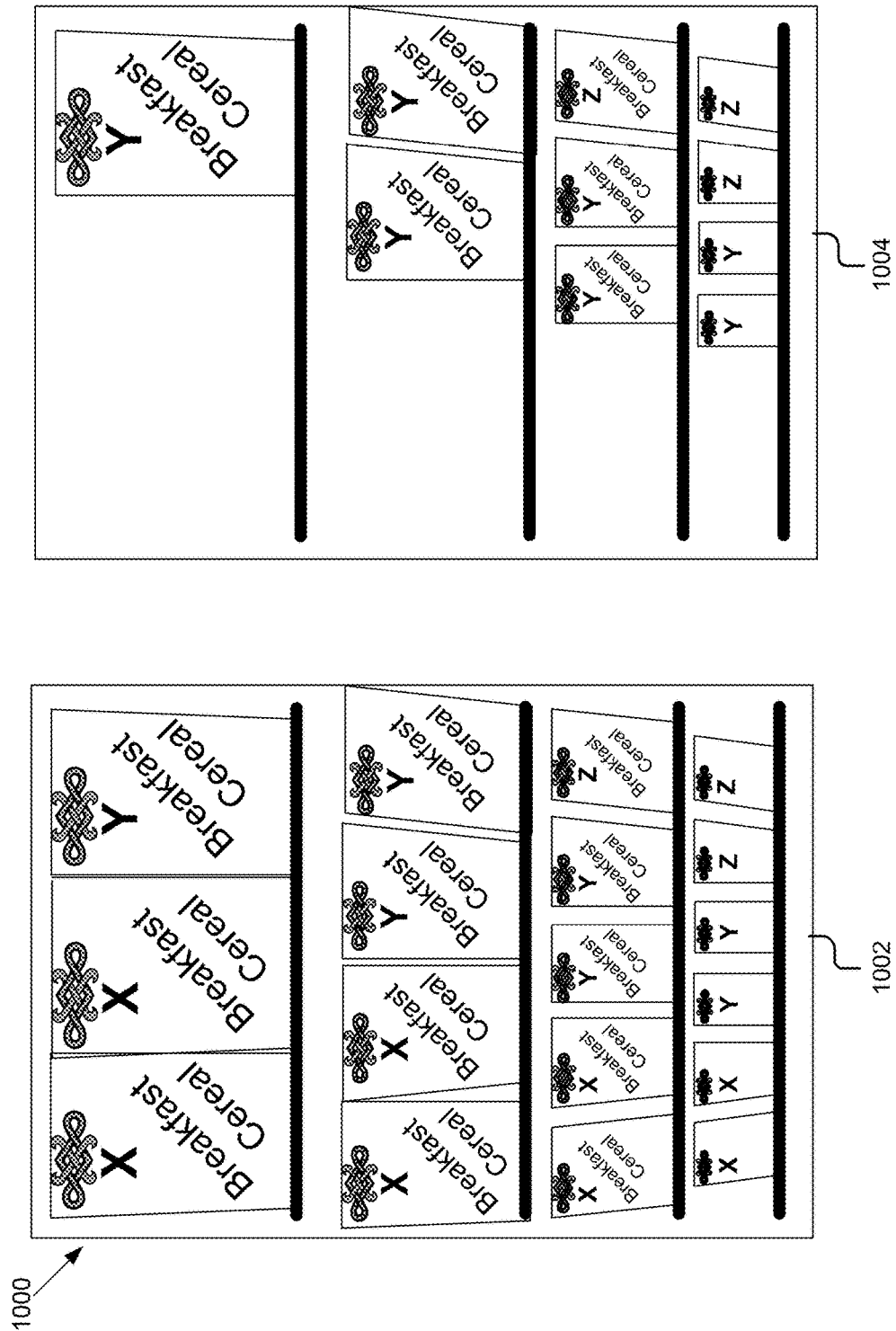
FIG. 10 is a graphical representation of an example product recall condition according to one embodiment.

FIG. 10 is a graphical representation 1000 of an example product recall condition. Images 1002 and 1004 depict shelves of a store before and after adjustment. The classification module 207 compares image 1002 with a list of recall products stored in a database, and determines a product recall condition. In the example of FIG. 10, all the breakfast cereal boxes with "X" label or cereal X should be recalled. The suggestion module 209 generates advice for a representative to pull cereal X boxes from the shelves. As a result, the left side of shelves, where the cereal X boxes were placed, is empty as shown in image 1004.

Figure 11:
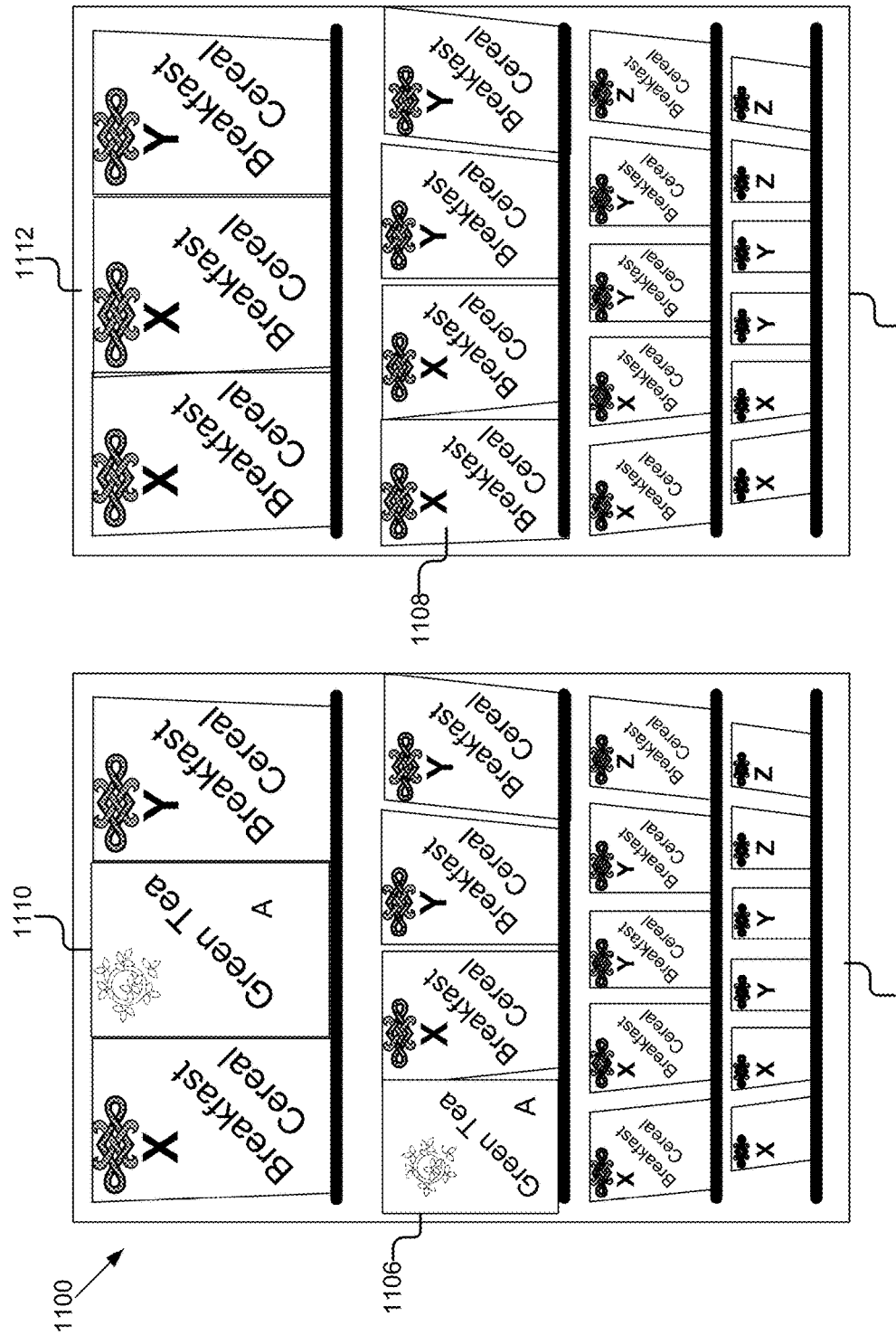
FIG. 11 is a graphical representation of an example position map condition according to one embodiment.

FIG. 11 is a graphical representation 1100 of an example position map condition. Images 1102 and 1104 depict shelves of a store before and after adjustment. The classification module 207 compares image 1102 with an image of a planogram by overlaying the image 1102 on the image of the planogram. From the overlay, the classification module 207 determines two non-overlaps. At locations 1106 and 1110, two green tea boxes are identified from image 1102 while two breakfast cereal boxes are identified from the image of the planogram. As a result, the suggestion module 209 generates advice for a representative to reposition the green tea boxes at locations 1106 and 1110 of image 1102. The representative performed the action and captured an image 1104 after correction. As shown in image 1104, two breakfast cereal boxes are placed at locations 1108 and 1112 corresponding to locations 1106 and 1110 of image 1102.

Figure 12:
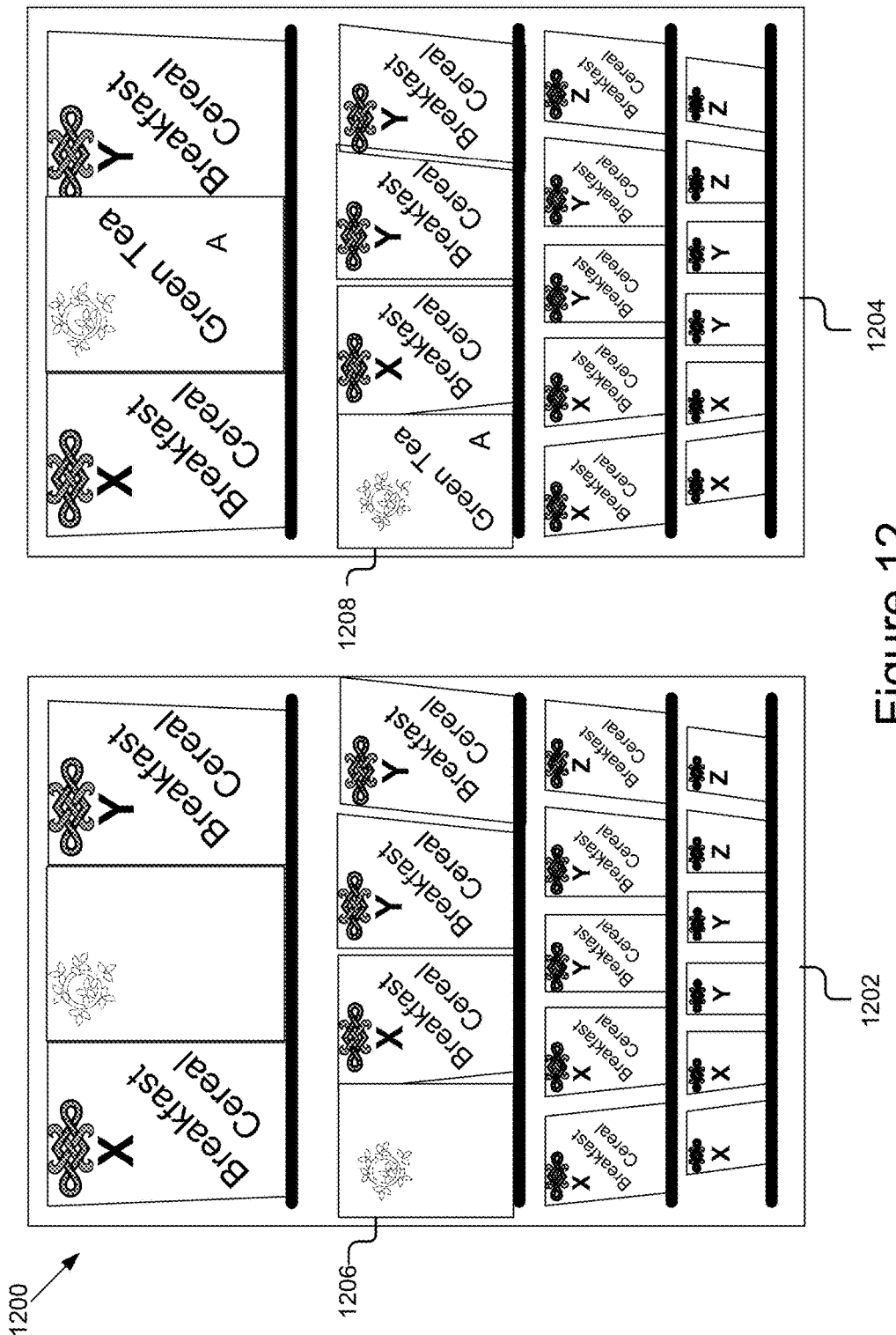
FIG. 12 is a graphical representation of an example new product condition according to one embodiment.

FIG. 12 is a graphical representation 1200 of an example new product condition. Images 1202 and 1204 depict shelves of a store before and after adjustment. The classification module 207 determines a new product condition based on information about an unindexed product at location 1206 of image 1202. The product information includes an image of the package, a package size, a product description (e.g., the flower logo), which cannot be matched to information stored in a database. The suggestion module 209 generates advice for a representative to capture additional information of the unindexed product. The additional information is used to recognize the product as green tea. As a result, the product at location 1208 of image 1204 is shown as green tea. The additional information is also added to the database for indexing and used to update the data stream.

Figure 13:
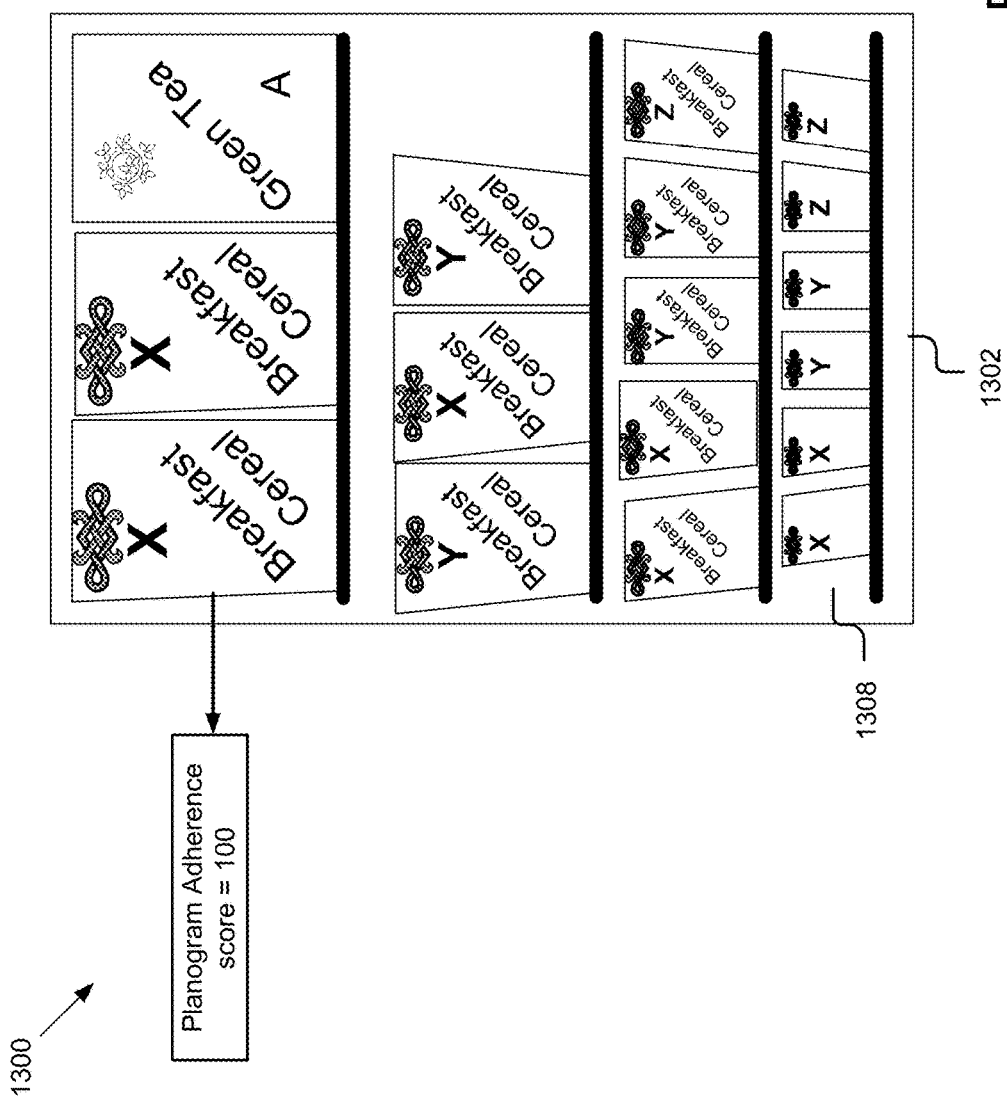
FIG. 13 is a graphical representation of an example planogram adherence condition according to one embodiment.

FIG. 13 is a graphical representation 1300 of an example planogram adherence condition. Image 1302 depicts products on shelves of a store. The classification module 207 determines a planogram adherence condition based on a planogram adherence score. As shown in image 1302, the classification module 207 determines that the products are in their expected locations and determines the planogram adherence score to be 100.

Figure 14:
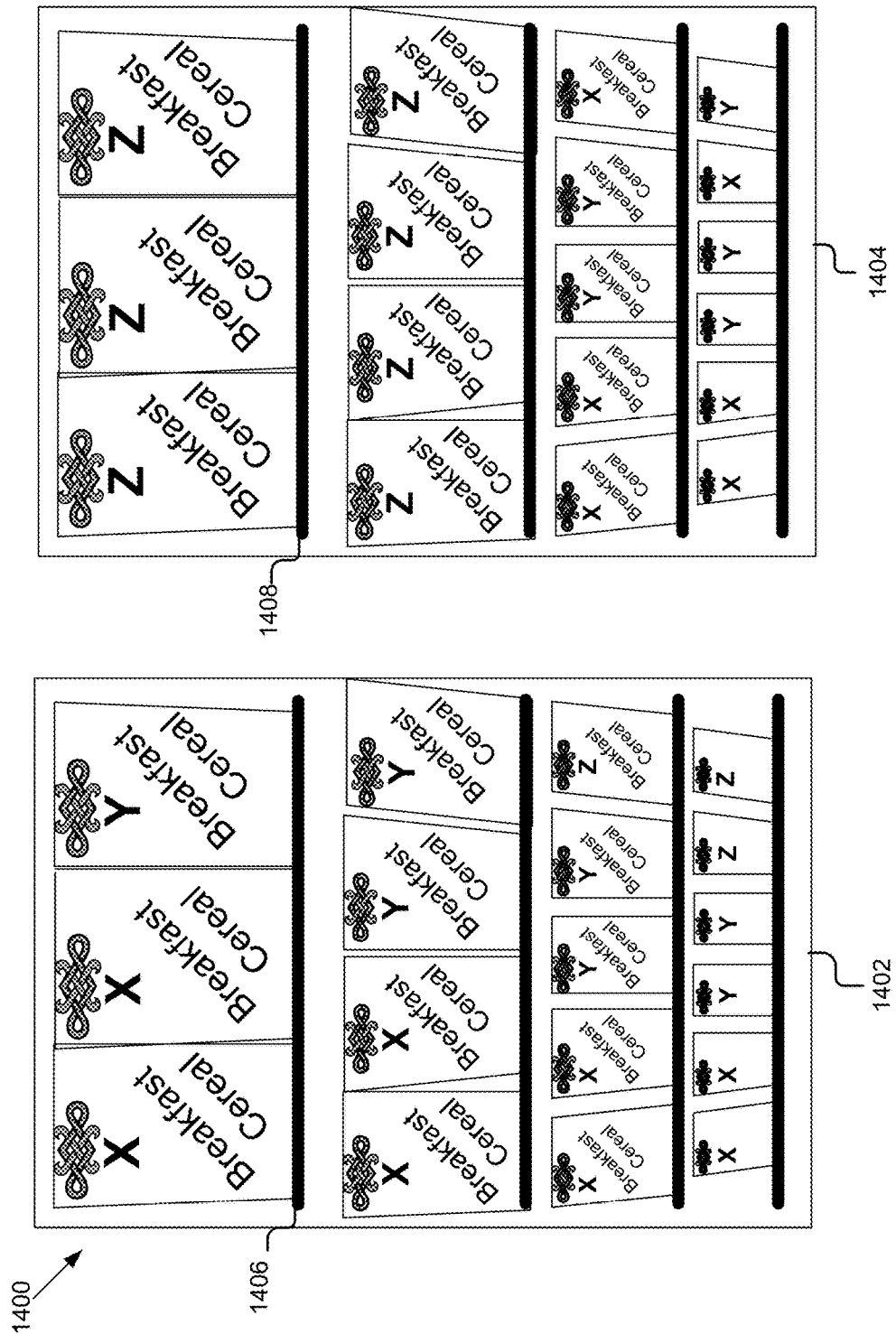
FIG. 14 is a graphical representation of an example profit potential condition according to one embodiment.

FIG. 14 is a graphical representation 1400 of an example profit potential condition. Images 1402 and 1404 depict shelves of a store before and after adjustment. The classification module 207 determines a profit potential condition based on a profit potential score. The profit potential score is used to measure the distance between the actual position of a product and a sweet spot (i.e., the most valuable location for the product). The suggestion module 209 transmits at least one suggestion associated with the profit potential score to a category manager. The category manager determines that the popular cereal Z should be positioned at the sweet spot (i.e., the center position of the top shelf) to increase the profits. As a result, cereal Z is moved from low shelves to the top shelf 1408 in image 1404 to be closer to the sweet spot of cereal Z, while cereals X and Y on shelf 1406 of image 1402 are relocated to bottom shelves in image 1404.

Figure 15:
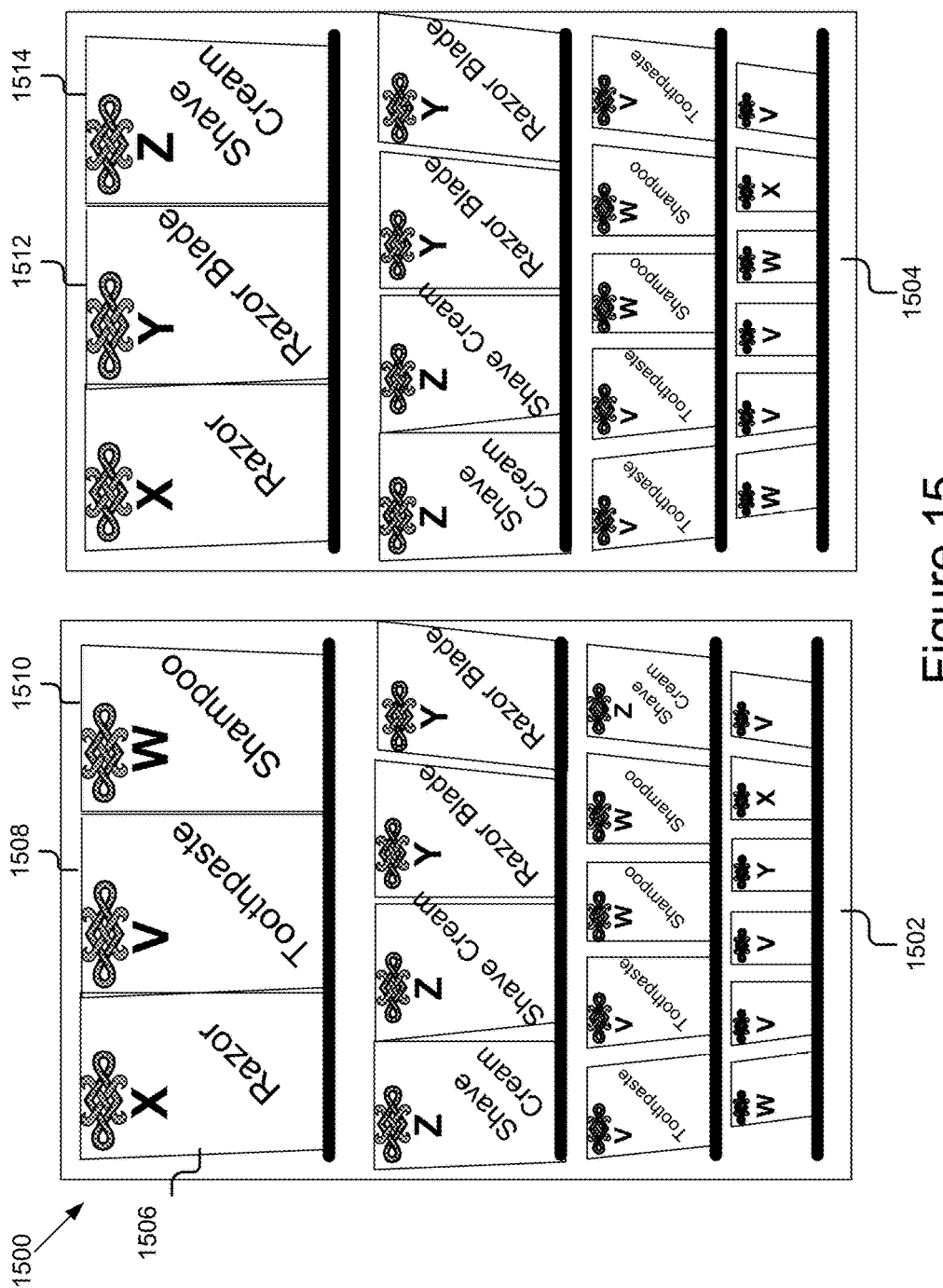
FIG. 15 is a graphical representation of an example contiguous product condition according to one embodiment.

FIG. 15 is a graphical representation 1500 of an example contiguous product condition. Images 1502 and 1504 depict shelves of a store before and after adjustment. The classification module 207 determines a contiguous product condition based on a contiguous product score. In image 1502, the razor at location 1506 sits with the toothpaste at location 1508 and the shampoo at location 1510. According to a planogram, the razor is supposed to neighbor with products in its SKU clusters to get the most profit, so the razor at location 1506 should sit with a razor blade or a shave cream. The contiguous product score captures the misplacements at locations 1508 and 1510. Once the suggestion module 209 transmits a suggestion associated with the contiguous product score to a user (e.g., a representative, a category manager), the user can adjust the shelves such that the razor blade and the shave cream are contiguous as shown by 1512 and 1514 in image 1504.

Figure 16:
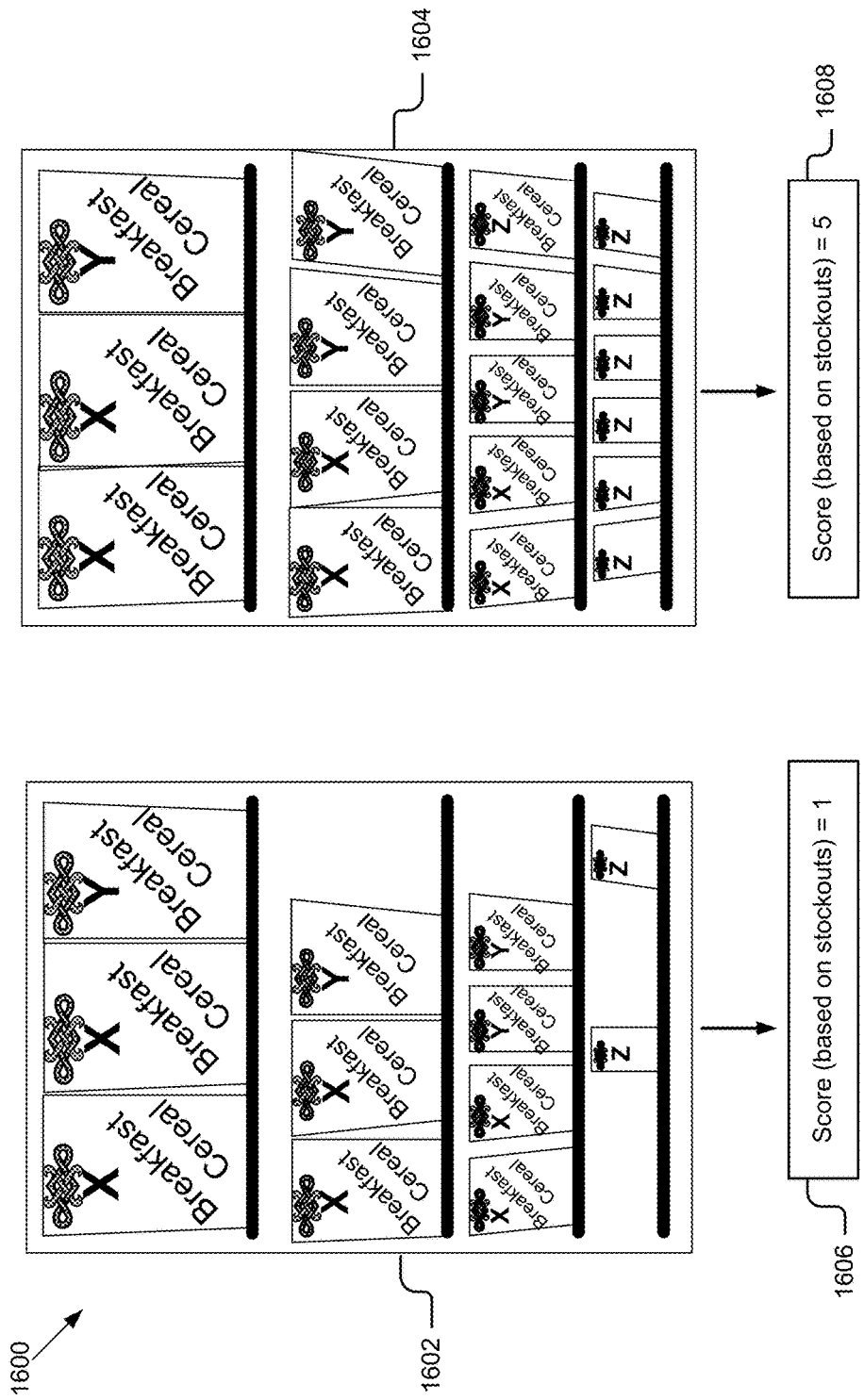
FIG. 16 is a graphical representation of an example representative performance condition according to one embodiment.

FIG. 16 is a graphical representation 1600 of an example representative performance condition. Image 1602 shows working area of a first representative. Image 1604 shows working area of a second representative. The classification module 207 determines a representative performance condition based on an influence score, a corrective actions score, and other scores for the first and second representatives. In the example of FIG. 16, the scorer 208 may compute a score based on the out of stock information. The scorer 208 determines a score 1606 of one for the first representative based on the out of stock products shown in image 1602. The scorer 208 also computes a score 1608 of five for the second representative based on lack of stockout product shown in image 1604. Responsive to receiving scores from the suggestion module 209, the first and second representatives may understand their scores and improve their performance accordingly.

Figure 17:
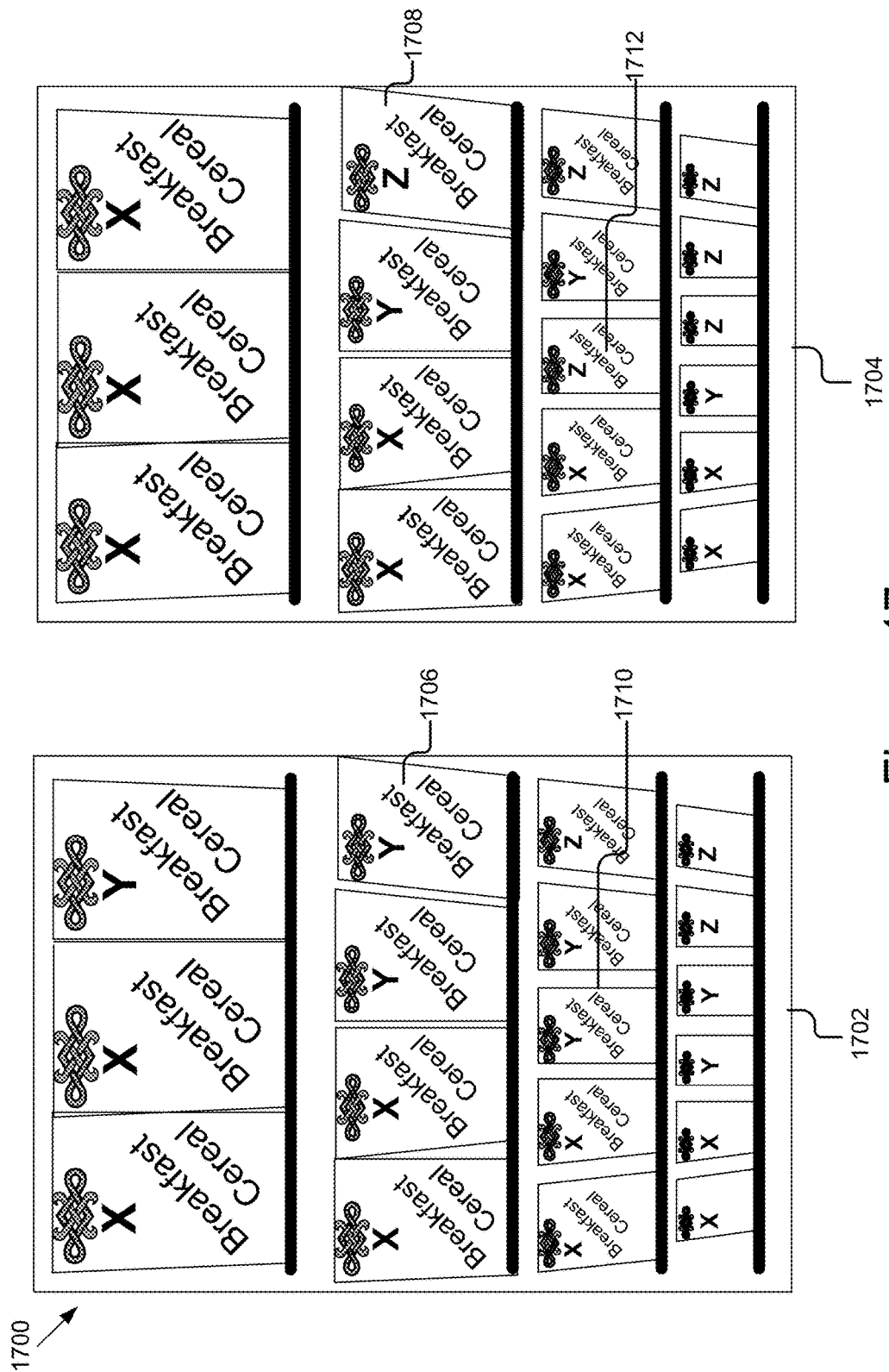
FIG. 17 is a graphical representation of an example promotional adherence condition according to one embodiment.

FIG. 17 is a graphical representation 1700 of an example promotional adherence condition. Images 1702 and 1704 depict shelves of a store before and after adjustment. The scorer 208 receives a current price of a product from image 1702 (e.g., from recognizing a price from a price label (not shown) in the image 1702) and a standard store price for the product based on user input. The scorer 208 computes a measured discount based on the standard store price and the current price of the product. The classification module 207 determines a promotional adherence condition based on promotion discount adherence score calculated using the measured discount and a target discount.

Additionally, the classification module 207 determines a relative price adherence condition based on a relative SKU price adherence score. The relative SKU price adherence score measures a price ratio between a SKU and other SKUs. The scorer 208 computes a relative price adherence score of 1.5 that indicates cereal X may be overpriced compared to other cereals Y and Z. Once a user (e.g., a category manager) receives a suggestion generated based on the relative price adherence score, the user can get a general sense about the store management and take an action to fix a problem if there is a problem. The category manager may determine to reduce the order of cereal Y since the sales data of cereal Y is lower than expected even if its price adherence score average over a time window show that the cereal Y is already underpriced. Image 1702 shows an amount of cereal Y located at different positions of shelves (e.g., 1706 and 1710). After the category manager changed the product order, image 1704 shows cereal Y is replaced by cereal Z at locations 1708 and 1712 corresponding to locations 1706 and 1710 in image 1702. Compared with image 1702, the total amount of cereal Y is reduced in image 1704.

A system and method for classifying conditions of a data stream of object information has been described. In the above description, for purposes of explanation, numerous specific details are set forth in order to provide a thorough understanding of the techniques introduced above. It will be apparent, however, to one skilled in the art that the techniques can be practiced without these specific details. In other instances, structures and devices are shown in block diagram form in order to avoid obscuring the description and for ease of understanding. For example, the techniques are described in one embodiment above primarily with reference to software and particular hardware. However, the present invention applies to any type of computing system that can receive data and commands, and present information as part of any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions described above are presented in terms of algorithms and symbolic representations of operations on data bits within a computer memory. These algorithmic descriptions and representations are, in some circumstances, used by those skilled in the data processing arts to convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing", "computing", "calculating", "determining", "displaying", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

Some embodiments can take the form of an entirely hardware embodiment, an entirely software embodiment or an embodiment containing both hardware and software elements. One embodiment is implemented in software, which includes but is not limited to firmware, resident software, microcode, etc.

Furthermore, some embodiments can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code can include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the techniques are not described with reference to any particular programming language. It will be appreciated that a variety of programming languages may be used to implement the teachings of the various embodiments as described herein.

The foregoing description of the embodiments has been presented for the purposes of illustration and description. It is not intended to be exhaustive or to limit the specification to the precise form disclosed. Many modifications and variations are possible in light of the above teaching. It is intended that the scope of the embodiments be limited not by this detailed description, but rather by the claims of this application. As will be understood by those familiar with the art, the examples may be embodied in other specific forms without departing from the spirit or essential characteristics thereof. Likewise, the particular naming and division of the modules, routines, features, attributes, methodologies and other aspects are not mandatory or significant, and the mechanisms that implement the description or its features may have different names, divisions and/or formats. Furthermore, as will be apparent to one of ordinary skill in the relevant art, the modules, routines, features, attributes, methodologies and other aspects of the specification can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the specification is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A method comprising:
    receiving, by one or more processors, an image;
    identifying, by the one or more processors, a plurality of objects from the image;
    generating, by the one or more processors, a time-series based data stream including information about the plurality of objects;
    determining, by the one or more processors, one or more conditions from the time-series based data stream by overlaying the image onto a planogram image to obtain non-overlapping position information of the plurality of objects;
identifying a first number of corrective actions from the time-series based data stream, the first number of corrective actions relating to the one or more conditions;
identifying, from the first number of corrective actions, a second number of repeating corrective actions that were previously identified from a previously generated time-series based data stream;
generating, by the one or more processors, a score based on the first number of corrective actions and the second number of repeating corrective actions;
generating, by the one or more processors, a suggestion based on the one or more conditions; and
providing, by the one or more processors, the suggestion and the score to a user along with a graphical guide that overlays on the image for identification of the one or more conditions, the suggestion including advice for performing a corrective action.

2. The method of claim 1, wherein the score indicates a measure of follow-through on the first number of corrective actions during a time period between a first time when the previously generated time-series based data stream was generated and a second time when the time-series based data stream is generated.

3. The method of claim 1, further comprising:
generating a new time-series based data stream including information about the plurality of objects at a third time;
identifying a third number of repeating corrective actions using the first number of corrective actions, the second number of repeating corrective actions, and the new time-series based data stream; and
generating the score based on the third number of repeating corrective actions.

4. The method of claim 1, further comprising determining a representative performance condition based on the score.

5. The method of claim 4, wherein determining the representative performance condition comprises:
determining an average percentage of a shelf space that the plurality of objects occupy in a time period;
receiving a targeted percentage of the shelf space that the plurality of objects are expected to occupy in the time period; and
comparing the average percentage and the targeted percentage.

6. The method of claim 1, wherein the one or more conditions are selected from the group of an out of stock condition, a product recall condition, a position map condition, and a new product condition.

7. The method of claim 1, wherein providing the suggestion to the user comprises a notification, the notification identifying the one or more conditions and a portion of data in the time-series based data stream that is associated with the one or more conditions.

8. A system comprising;
one or more processors; and
a memory, the memory storing instructions, which when executed cause the one or more processor to:
receive an image;
identify a plurality of objects from the image;
generate a time-series based data stream including information about the plurality of objects;
determine one or more conditions from the time-series based data stream by overlaying the image onto a planogram image to obtain non-overlapping position information of the plurality of objects;
identify a first number of corrective actions from the time-series based data stream, the first number of corrective actions relating to the one or more conditions;
identify, from the first number of corrective actions, a second number of repeating corrective actions that were previously identified from a previously generated time-series based data stream;
generate, by the one or more processors, a score based on the first number of corrective actions and the second number of repeating corrective actions;
generate a suggestion based on the one or more conditions; and
provide the suggestion and the score to a user along with a graphical guide that overlays on the image for identification of the one or more conditions, the suggestion including advice for performing a corrective action.

9. The system of claim 8, wherein the score indicates a measure of follow-through on the first number of corrective actions during a time period between a first time when the previously generated time-series based data stream was generated and a second time when the time-series based data stream is generated.

10. The system of claim 8, wherein the instructions cause the one or more processors to:
generate a new time-series based data stream including information about the plurality of objects at a third time;
identify a third number of repeating corrective actions using the first number of corrective actions, the second number of repeating corrective actions, and the new time-series based data stream; and
generate the score based on the third number of repeating corrective actions.

11. The system of claim 8, wherein the instructions cause the one or more processors to determine a representative performance condition based on the score.

12. The system of claim 11, wherein to determine the representative performance condition, the instructions cause the one or more processors to:
determine an average percentage of a shelf space that the plurality of objects occupy in a time period;
receive a targeted percentage of the shelf space that the plurality of objects are expected to occupy in the time period; and
compare the average percentage and the targeted percentage.

13. The system of claim 8, wherein the one or more conditions are selected from the group of an out of stock condition, a product recall condition, a position map condition, and a new product condition.

14. The system of claim 8, wherein providing the suggestion to the user comprises a notification, the notification identifying the one or more conditions and a portion of data in the time-series based data stream that is associated with the one or more conditions.

15. A computer program product comprising a non-transitory computer readable medium storing a computer readable program, wherein the computer readable program, when executed, causes a computer to perform operations comprising:
receiving an image;
identifying a plurality of objects from the image;

generating a time-series based data stream including information about the plurality of objects;

determining one or more conditions from the time-series based data stream by overlaying the image onto a planogram image to obtain non-overlapping position information of the plurality of objects;

identifying a first number of corrective actions from the time-series based data stream, the first number of corrective actions relating to the one or more conditions;

identifying, from the first number of corrective actions, a second number of repeating corrective actions that were previously identified from a previously generated time-series based data stream;

generating, by the one or more processors, a score based on the first number of corrective actions and the second number of repeating corrective actions;

generating a suggestion based on the one or more conditions; and providing the suggestion and the score to a user along with a graphical guide that overlays on the image for identification of the one or more conditions, the suggestion including advice for performing a corrective action.

16. The computer program product of claim 15, wherein the score
indicates a measure of follow-through on the first number of corrective actions during a time period between a first time when the previously generated time-series based data stream was generated and a second time when the time-series based data stream is generated.

17. The computer program product of claim 15, wherein the computer readable program causes the computer to perform operations comprising:
generating a new time-series based data stream including information about the plurality of objects at a third time;
identifying a third number of repeating corrective actions using the first number of corrective actions, the second number of repeating corrective actions, and the new time-series based data stream; and
generating the score based on the third number of repeating corrective actions.

18. The computer program product of claim 15, wherein the computer readable program causes the computer to perform operations comprising determining a representative performance condition based on the score.

19. The computer program product of claim 18, wherein to determine the representative performance condition, the computer readable program causes the computer to perform operations comprising:
determining an average percentage of a shelf space that the plurality of objects occupy in a time period;
receiving a targeted percentage of the shelf space that the plurality of objects are expected to occupy in the time period; and
comparing the average percentage and the targeted percentage.

20. The computer program product of claim 15, wherein the one or more conditions are selected from the group of an out of stock condition, a product recall condition, a position map condition, and a new product condition.

* * * * *